(12) United States Patent
Shinpuku et al.

(10) Patent No.: US 7,839,991 B2
(45) Date of Patent: Nov. 23, 2010

(54) COMPUTER PRODUCT, OUTBOUND-OPERATION SUPPORT APPARATUS, AND OUTBOUND-OPERATION SUPPORT METHOD

(75) Inventors: Satoshi Shinpuku, Kawasaki (JP); Sachiko Onodera, Kawasaki (JP); Isao Nanba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 772 days.

(21) Appl. No.: 11/881,537

(22) Filed: Jul. 27, 2007

(65) Prior Publication Data

US 2008/0080697 A1  Apr. 3, 2008

(30) Foreign Application Priority Data

Sep. 28, 2006  (JP) .............................. 2006-266077

(51) Int. Cl.
*H04M 3/00* (2006.01)
(52) U.S. Cl. ............................ 379/265.12; 379/265.02; 379/265.06; 379/265.07; 379/265.11; 379/265.13; 379/266.01; 379/266.02; 379/266.03
(58) Field of Classification Search ............ 379/265.02, 379/265.06, 265.07, 265.11, 265.13, 266.01–266.03
See application file for complete search history.

(56) References Cited

U.S. PATENT DOCUMENTS

| | | | | |
|---|---|---|---|---|
| 5,465,286 | A * | 11/1995 | Clare et al. | 379/32.04 |
| 6,751,310 | B1 * | 6/2004 | Crossley | 379/266.07 |
| 7,555,114 | B1 * | 6/2009 | Stahr | 379/265.01 |
| 2003/0174830 | A1 * | 9/2003 | Boyer et al. | 379/265.02 |
| 2005/0226403 | A1 * | 10/2005 | Lenard | 379/266.07 |
| 2006/0062376 | A1 * | 3/2006 | Pickford | 379/265.12 |
| 2007/0041557 | A1 * | 2/2007 | Chatterjee et al. | 379/218.01 |

FOREIGN PATENT DOCUMENTS

JP  2004-355108  12/2004

* cited by examiner

*Primary Examiner*—Curtis Kuntz
*Assistant Examiner*—Phung-Hoang J Nguyen
(74) *Attorney, Agent, or Firm*—Greer, Burns & Crain, Ltd.

(57) ABSTRACT

An outbound-operation support apparatus extracts a set of materials corresponding to received contents of an operation from a material database (DB) and extracts a theme and a knowledge-level value having a success rate larger than a predetermined threshold value from a value DB. Thereafter, a set of customer identifications corresponding to each of the extracted themes and the knowledge-level values is extracted from another value DB, and customer information corresponding to each of the customer identifications is extracted from a customer DB. The extracted material and the customer information are associated with each another and transmitted to an outbound agent terminal.

15 Claims, 19 Drawing Sheets

FIG.3

| AGENT ID | CUSTOMER ID | RESPONSE DATE/TIME | RESPONSE VOICE | RESPONSE LOG | USED SEARCH KEY | USED KNOWLEDGE ID |
|---|---|---|---|---|---|---|
| Op0021 | Cu00013 | 2006/7/8 10:15:50 | 0008112.mpg | 0008112.log | MAIL, TRANS-MITTING/ RECEIVING, UNABLE | Kn0021.txt |
| Op0101 | Cu03138 | 2006/7/8 10:16:13 | 0008113.mpg | 0008113.log | MB、BIOS、UPDATE | Kn0051.txt |
| ⋮ | ⋮ | ⋮ | ⋮ | ⋮ | ⋮ | ⋮ |

FIG.4

| KNOWLEDGE ID | THEME |
|---|---|
| Kn001905 | ABOUT PC CONFIGURATION |
| Kn001906 | ABOUT PC SOFTWARE |
| ⋮ | ⋮ |

FIG.5

| REQUEST | MATERIAL |
|---|---|
| PC NEW-PRODUCT INTRODUCTION | PC NEW-PRODUCT INTRODUCTION (BEGINNER-FAMILIER FUNCTION EMPHASIZED) |
| PC NEW-PRODUCT INTRODUCTION | PC NEW-PRODUCT INTRODUCTION (SPEC-EMPHASIZED) |
| ⋮ | ⋮ |

FIG.6

| MATERIAL OVERVIEW | RELATED THEME | CUSTOMER-LEVEL VALUE | EFFECT |
|---|---|---|---|
| PC NEW-PRODUCT INTRODUCTION (BEGINNER-FAMILIER FUNCTION EMPHASIZED) | PC CONFIGURATION | 2 | 0.48 |
| PC NEW-PRODUCT INTRODUCTION (SPEC-EMPHASIZED) | PC CONFIGURATION | 3 | 0.82 |
| ⋮ | ⋮ | ⋮ | ⋮ |

FIG.7

| CUSTOMER ID | THEME | CUSTOMER-LEVEL VALUE |
|---|---|---|
| Cu00013 | ABOUT PC CONFIGURATION | 3 |
| Cu03138 | ABOUT NETWORK | 2 |
| Cu03137 | ABOUT PC CONFIGURATION | 3 |
| Cu00264 | ABOUT PC SOFTWARE | 1 |
| Cu03122 | ABOUT NETWORK | 2 |
| ⋮ | ⋮ | ⋮ |

FIG.8

| CUSTOMER ID | CUSTOMER NAME | CUSTOMER CONTACT INFORMATION |
|---|---|---|
| Cu00013 | ○○ ▽▽ | 03-3333-3333 |
| Cu03138 | ▲▲ □□ | 03-3333-3334 |
| ⋮ | ⋮ | ⋮ |

FIG.11

| EQUATION FOR CALCULATING CUSTOMER-KNOWLEDGE-LEVEL VALUE |
|---|
| CUSTOMER-KNOWLEDGE LEVEL VALUE= $\alpha \times$ WORD-LEVEL VALUE + $(1-\alpha)$TIME-LEVEL VALUE<br><br>$\alpha$: ARBITRAL COEFFICIENT |

FIG.13

CASE ID: 0902

QUERY STATEMENT: HOW TO SET
BROWSER PROXY?

REPLY: (1) OPEN INTERNET OPTION
(2) · · ·

FIG.15

| AGENT ID | AGENT SKILL LEVEL |
|----------|-------------------|
| Op0001   | 56                |
| Op0002   | 51                |
| ⋮        | ⋮                 |

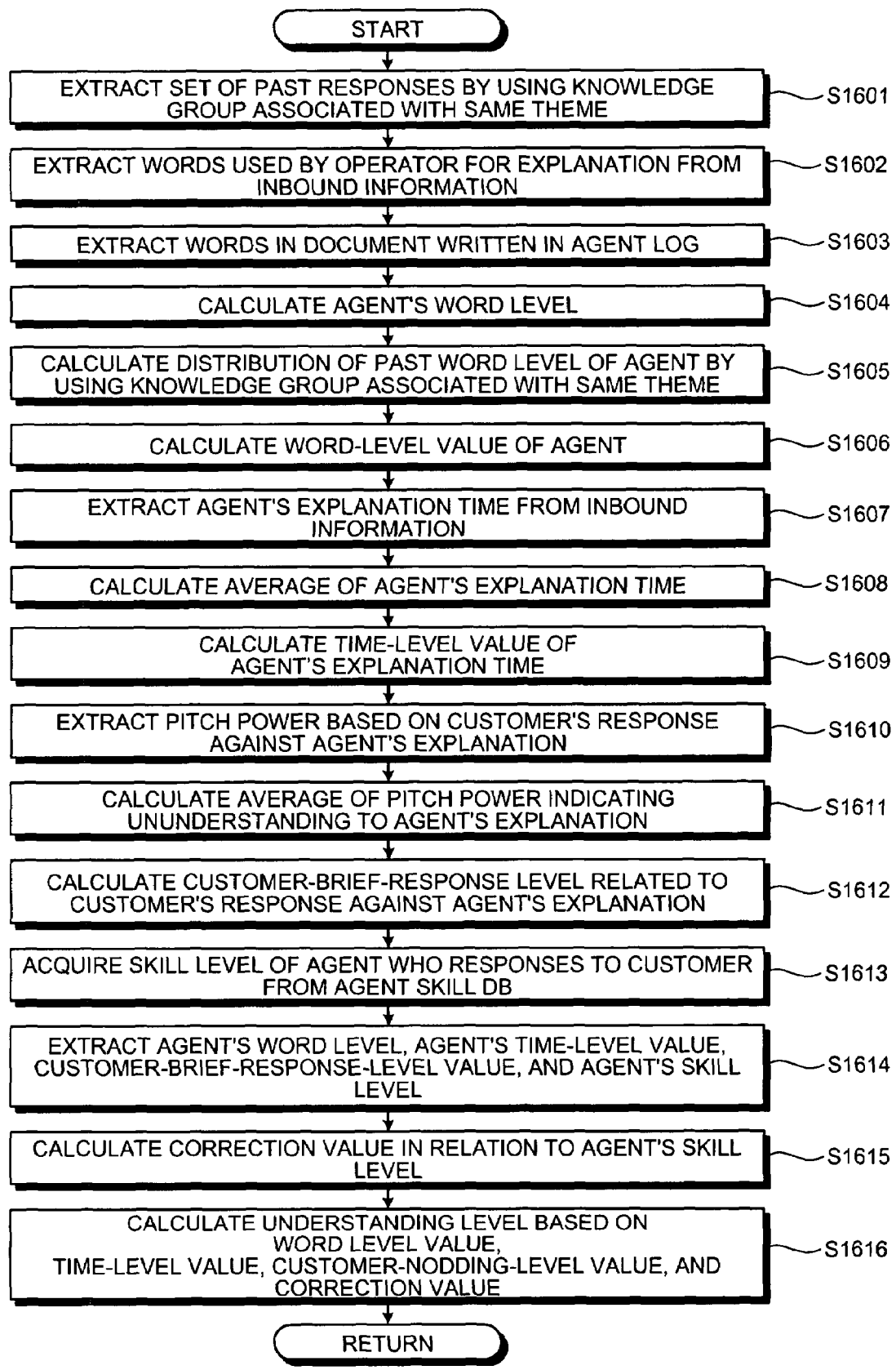

FIG.17

| EQUATION FOR CALCULATING CORRECTION VALUE |
|---|
| $$Os(X,L1) = \frac{\sum_{\text{all levels}} \alpha \times Ot(X) + \beta \times Ca(X) + (1-\alpha-\beta) \times Ow(X) \Big/ \text{number of all responses}}{\sum_{L1} \alpha \times Ot(X) + \beta \times Ca(X) + (1-\alpha-\beta) \times Ow(X) \Big/ \text{number of response of L1}}$$ Ot(X): AGENT'S-TIME-LEVEL VALUE<br>Ca(X): CUSTOMER'S-BRIEF-RESPONSE-LEVEL VALUE<br>Ow(X): AGENT'S- WORD-LEVEL VALUE<br>Os(X, L): CORRECTION VALUE |

FIG.18

| EQUATION FOR CALCULATING UNDERSTANDING-LEVEL VALUE |
|---|
| UNDERSTANDING-LEVEL VALUE=($\alpha \times$Ot(X)+$\beta \times$Ca(X)+(1-$\alpha$-$\beta$)$\times$Ow(X))$\times$Os(X, L)<br><br>$\alpha, \beta$ : ARBITRAL COEFFICIENT<br>Ot(X): AGENT'S-TIME-LEVEL VALUE<br>Ca(X): CUSTOMER'S-BRIEF-RESPONSE-LEVEL VALUE<br>Ow(X): AGENT'S- WORD-LEVEL VALUE<br>Os(X, L): CORRECTION VALUE |

FIG.19

| EQUATION FOR CALCULATING CUSTOMER-KNOWLEDGE-LEVEL VALUE |
|---|
| CUSTOMER-KNOWLEDGE-LEVEL VALUE= $\alpha$ $\times$ WORD-LEVEL VALUE<br>$\beta$ $\times$TIME-LEVEL VALUE+(1-$\alpha$-$\beta$)$\times$UNDERSTANDING-LEVEL VALUE<br><br>$\alpha, \beta$ : ARBITRAL COEFFICIENT |

FIG.21

| CUSTOMER ID | OUTBOUND CONTENTS | USED MATERIAL OVERVIEW | OUTBOUND DATE/TIME | OUTBOUND RESULT |
|---|---|---|---|---|
| Cu00013 | PC NEW-PRODUCT INTRODUCTION | PC NEW-PRODUCT INTRODUCTION (SPEC-CONCERNED) | 2005/9/8 10:10:15 | FAILURE |
| Cu03138 | PC NEW-PRODUCT INTRODUCTION | PC NEW-PRODUCT INTRODUCTION (SPEC-CONCERNED) | 2005/9/8 10:10:23 | SUCCESS |
| ⋮ | ⋮ | ⋮ | ⋮ | ⋮ |

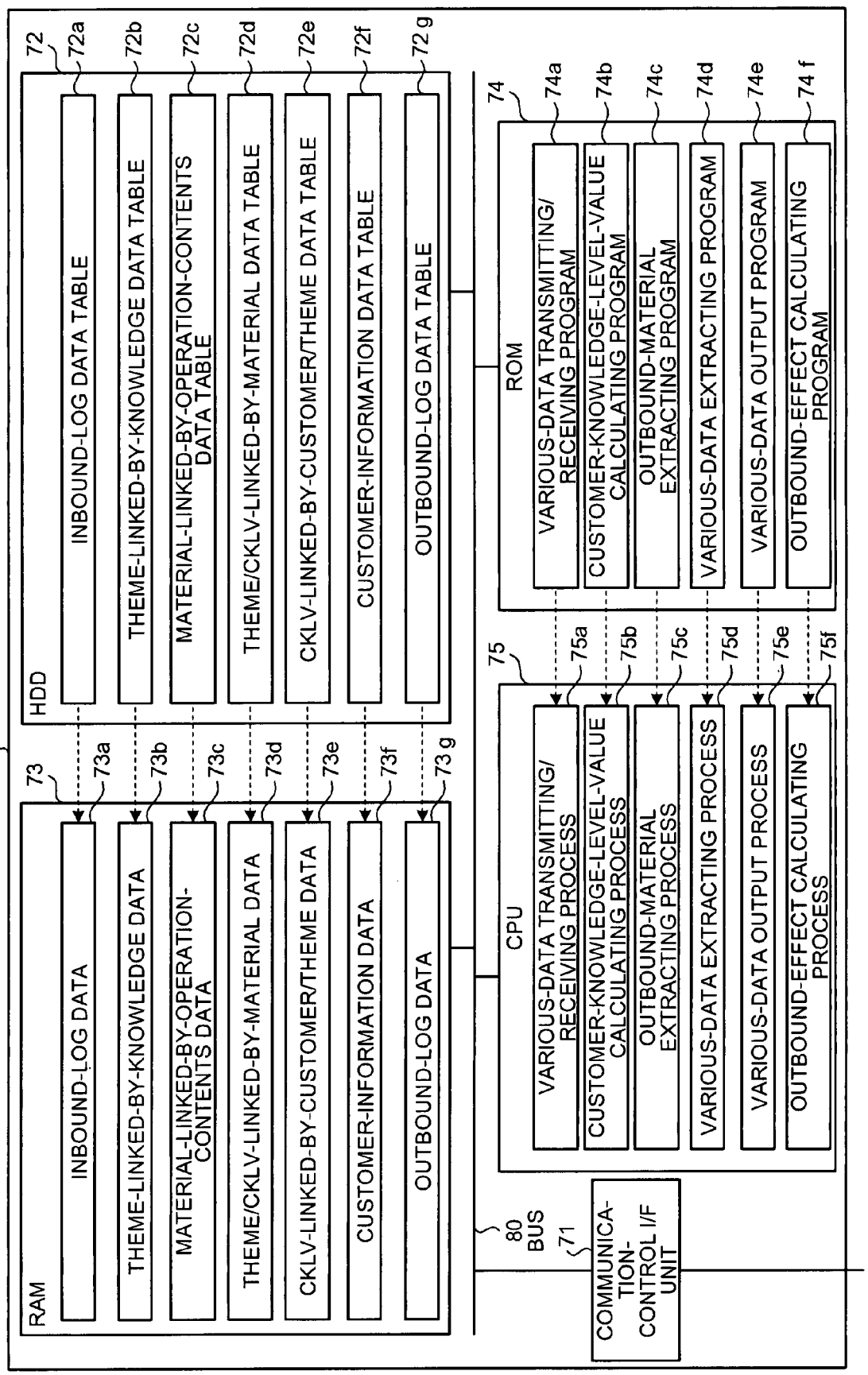

COMPUTER PRODUCT, OUTBOUND-OPERATION SUPPORT APPARATUS, AND OUTBOUND-OPERATION SUPPORT METHOD

BACKGROUND OF THE INVENTION

1. Field of the Invention

The present invention relates to a technology for supporting an outbound operation in a call center.

2. Description of the Related Art

In call centers operated by business enterprises, an outbound operation and an inbound operation are performed. The outbound operation is an operation performed when promoting sales and includes, for example, making phone calls to potential customers to introduce them new products. On the other hand, the inbound operation is an operation performed for supporting customers and includes, for example, responding to a question by telephone and E-mail from the customers.

Japanese Patent Application Laid-Open No. 2004-355108, for example, discloses a technology for performing the inbound operation. It includes estimating a knowledge level of a customer, counting a response time taken by a customer for answering agent's question in an inbound operation, and using the knowledge level. The knowledge level of a customer is estimated from the technical words used in the telephone conversation between the customer and the agent and the response time in subsequent inbound operation.

On the other hand, agents perform the outbound operation by a trial-and-error approach based on the intuition of the agent over a conversation to the potential customer.

However, if the outbound operation is performed in the conventional way, there is a problem that a customer acquisition rate is not sufficiently improved. In other words, because information related to the potential customers is hardly obtained, the agent needs to use a uniformly selected material for various potential customers and to promote the sales by the trial-and-error approach based on the intuition of the agent. That is why the customer acquisition rate is not sufficiently improved.

Alternatively, one option is to select the material to be used for the outbound operation based on the information about the potential customers and that has been acquired by conducting a guest survey or researching a buying history. However, if the inquire survey or the research is carried on exclusively for improving the customer acquisition rate, there is a problem that costs for acquiring the information become expensive.

Thus, there is a need of a technology that can increase customer acquisition rate in outbound operations in call centers.

SUMMARY OF THE INVENTION

It is an object of the present invention to at least partially solve the problems in the conventional technology.

According to an aspect of the present invention, an outbound-operation support apparatus that supports an outbound operation with respect to customers by using information obtained through an inbound operation with respect to the customers includes a first storing unit that stores therein an outbound material used for the outbound operation by associating the outbound material with contents of the outbound operation, a second storing unit that stores therein a related theme related to the outbound material, a customer knowledge level determined in advance with respect to each customer, and a success rate obtained when the outbound operation is performed by using the outbound material, by associating each of the related theme, the customer knowledge level, and the success rate with the outbound material, a third storing unit that stores therein a theme and the customer knowledge level that have been used for performing the inbound operation, by associating each of the theme and the customer knowledge level with a customer identifier unique to each of the customers, a fourth storing unit that stores therein customer information related to each of the customers, by associating the customer information with the customer identifier, a first extracting unit that extracts the outbound material stored in the first storing unit based on the contents of the outbound operation upon receiving input of the contents of the outbound operation, a second extracting unit that extracts the related theme and the customer knowledge level that correspond to the outbound material extracted by the first extracting unit and for which the success rate corresponding to the outbound material extracted by the first extracting unit is larger than a predetermined threshold value from among the related theme and the customer knowledge level stored in the second storing unit, a third extracting unit that extracts the customer identifier stored in the third storing unit, in relation to the related theme and the customer knowledge level extracted by the second extracting unit, a fourth extracting unit that extracts the customer information stored in the fourth storing unit, in relation to the customer identifier extracted by the third extracting unit and an output unit that outputs the outbound material extracted by the first extracting unit and the customer information extracted by the fourth extracting unit.

According to another aspect of the present invention, a method of supporting an outbound operation with respect to customers by using information obtained through an inbound operation with respect to the customers includes first storing including storing an outbound material used for the outbound operation by associating the outbound material with contents of the outbound operation, second storing including storing a related theme related to the outbound material, a customer knowledge level determined in advance with respect to each customer, and a success rate obtained when the outbound operation is performed by using the outbound material, by associating each of the related theme, the customer knowledge level, and the success rate with the outbound material, third storing including storing a theme and the customer knowledge level that have been used for performing the inbound operation, by associating each of the theme and the customer knowledge level with a customer identifier unique to each of the customer, fourth storing including storing customer information related to each of the customers, by associating the customer information with the customer identifier, first extracting including extracting the outbound material stored at the first storing based on the contents of the outbound operation upon receiving input of the contents of the outbound operation, second extracting including extracting the related theme and the customer knowledge level that correspond to the outbound material extracted at the first extracting and for which the success rate corresponding to the outbound material extracted at the first extracting is larger than a predetermined threshold value from among the related theme and the customer knowledge level stored at the second storing, third extracting including extracting the customer identifier stored at the third storing, in relation to the related theme and the customer knowledge level extracted at the second extracting, fourth extracting including extracting the customer information stored at the fourth storing, in relation to the customer identifier extracted at the third extracting, and outputting the outbound material extracted at the first extracting and the customer information extracted at the fourth extracting.

According to still another aspect of the present invention, a computer-readable recording medium stores therein a computer program that implements the above method on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is an example of the contents of an inbound-log database (DB) shown in FIG. 2;

FIG. 4 is an example of the contents of a theme-linked-by-knowledge DB shown in FIG. 2;

FIG. 5 is an example of the contents of a material-linked-by-operation-contents DB shown in FIG. 2;

FIG. 6 is an example of the contents of a theme/CKLV-linked-by-material DB shown in FIG. 2 (CKLV means customer knowledge level value);

FIG. 7 is an example of the contents of a CKLV-linked-by-customer/theme DB shown in FIG. 2 (CKLV means customer knowledge level value);

FIG. 8 is an example of the contents of a customer information DB shown in FIG. 2;

FIG. 11 is an example of an equation for calculating a customer-knowledge-level value by the outbound-operation support apparatus shown in FIG. 2;

FIG. 13 is an example of the contents of a knowledge to which an agent using the outbound-operation support apparatus shown in FIG. 2 refers;

FIG. 15 is an example of the contents of an agent skill DB according to a second embodiment of the present invention;

FIG. 16 is a flowchart of an understanding-level-value calculation processing according to the second embodiment;

FIG. 17 is an example of an equation for calculating a correction value according to the second embodiment;

FIG. 18 is an example of an equation for calculating an understanding-level value according to the second embodiment;

FIG. 19 is an example of an equation for calculating a customer-knowledge-level value according to the second embodiment;

FIG. 21 is an example of the contents of an outbound log DB shown in FIG. 20;

FIG. 24 is a block diagram of a computer that executes the outbound-operation support program according to a fifth embodiment of the present invention.

DETAILED DESCRIPTION OF THE PREFERRED EMBODIMENTS

Exemplary embodiments of the present invention are explained below in detail with reference to the accompanying drawings. The present invention is not limited to the embodiments.

Figure 1:
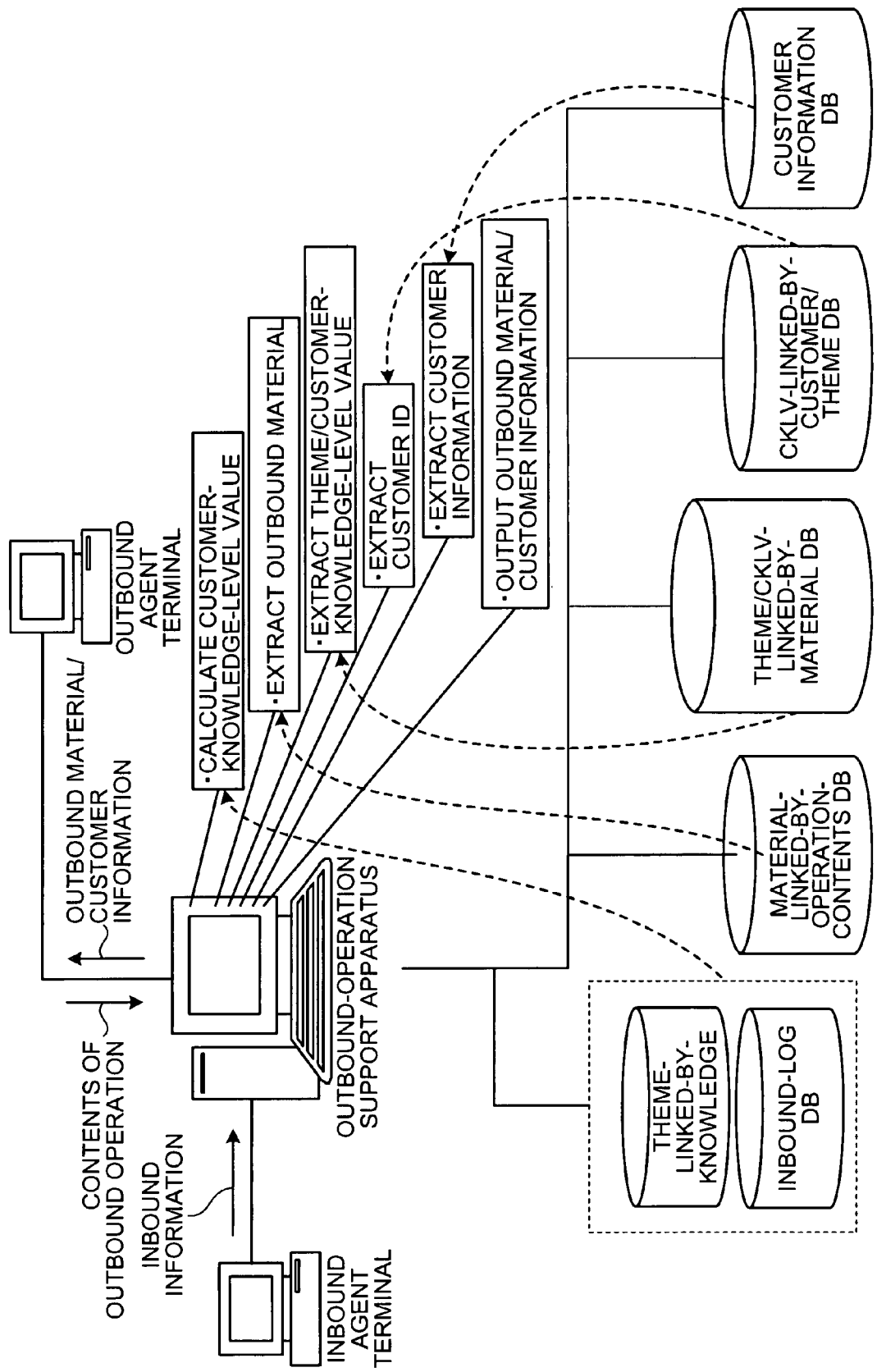
FIG. 1 is a schematic for explaining a concept and a salient feature of an outbound-operation support apparatus according to a first embodiment of the present invention.

FIG. 1 is a schematic for explaining a concept and a salient feature of an outbound-operation support apparatus according to a first embodiment of the present invention.

The concept of the outbound-operation support apparatus shown in FIG. 1 is to support outbound operations by using information obtained through inbound operations. The outbound operation is an operation performed when promoting sales and includes, for example, making phone calls to potential customers to introduce them new products. On the other hand, the inbound operation is an operation performed for supporting customers and includes, for example, responding to telephone queries from the customers. The outbound-operation support apparatus is characterized in that it helps in increasing customer acquisition rate in outbound operations.

As shown in FIG. 1, the outbound-operation support apparatus is communicably connected to an inbound agent terminal and an outbound agent terminal via a network such as a local area network (LAN). The inbound agent terminal is used by an agent when performing an inbound operation, while the outbound agent terminal is used by an agent when performing an outbound operation.

The outbound-operation support apparatus includes a theme-linked-by-knowledge database (DB) that stores therein a knowledge used for the inbound operation and a theme related to the knowledge by associating with each another, and an inbound-log DB that stores therein inbound information received from the inbound agent terminal.

The outbound-operation support apparatus includes a material-linked-by-operation-contents DB, a theme/CKLV-linked-by-material DB, a CKLV-linked-by-customer/theme DB, and a customer information DB. The material-linked-by-operation-contents DB stores therein an outbound material by associating it with the contents of the outbound operation. The theme/CKLV-linked-by-material DB stores therein a theme related to the outbound material, a customer-knowledge-level value (CKLV) stored in advance with respect to each operation-target customer, and a success rate that indicates an effect of the outbound operation performed by using the outbound material, by associating each with a recommended material for the outbound operation. The success rate is obtained by, for example, dividing the number of successfully completed contracts by the total number of the performed outbound operations. The CKLV-linked-by-customer/theme DB stores therein the theme and the customer-knowledge-level value used for the inbound operation by associating each with a customer-identification (ID) that uniquely identifies a customer. The customer information DB stores therein customer information such as a customer name and customer contact information in association with the customer ID.

Upon receiving contents of an outbound operation from an agent, through the outbound agent terminal, the outbound-operation support apparatus outputs the outbound material and the customer information corresponding to the outbound operation to the outbound agent terminal.

Specifically, upon receiving the contents from the agent, the outbound-operation support apparatus extracts a set of the outbound materials corresponding to the received contents from the material-linked-by-operation-contents DB. Thereafter, the outbound-operation support apparatus extracts the theme and the customer-knowledge-level value having the success rate that is larger than a predetermined threshold value (for example, larger than 1%) determined in advance with respect to each outbound material as an effect of the outbound material, from the theme/CKLV-linked-by-material DB for each of the extracted outbound materials.

The outbound-operation support apparatus extracts a set of the customer IDs corresponding to the theme and the customer-knowledge-level value for each of the extracted themes and the extracted customer-knowledge-level values, from the CKLV-linked-by-customer/theme DB. Thereafter, the outbound-operation support apparatus extracts customer information corresponding to each of the customer IDs for the extracted set of the customer IDs, from the customer-information DB.

The outbound-operation support apparatus checks whether processes related to the extraction of the customer information for all the extracted outbound materials are completed. If the processes for all the extracted outbound materials have been completed, the outbound-operation support apparatus outputs the outbound material and the customer information by associating with each another and transmits them to the outbound agent terminal.

The outbound-operation support apparatus calculates the customer-knowledge-level value by, for example, upon receiving an instruction from an administrator. Specifically, the outbound-operation support apparatus acquires a knowledge ID of a knowledge ultimately used for the inbound operation from the inbound information stored in the inbound-log DB, and extracts the theme corresponding to the knowledge ID from the theme-linked-by-knowledge DB. Thereafter, the outbound-operation support apparatus calculates a word-level value and a time-level value of the customer, calculates the customer-knowledge-level value based on the calculated word-level value and the calculated time-level value, and stores the calculated customer-knowledge-level value in the corresponding databases (the theme/CKLV-linked-by-material DB and the CKLV-linked-by-customer/theme DB). The purpose of the above operation is to effectively perform the outbound operation from customer-related information that is collected in inbound operations and continuously updating the customer-knowledge-level value.

As described above, the outbound-operation support apparatus supports the outbound operation and helps in improving the customer acquisition rate.

Figure 2:
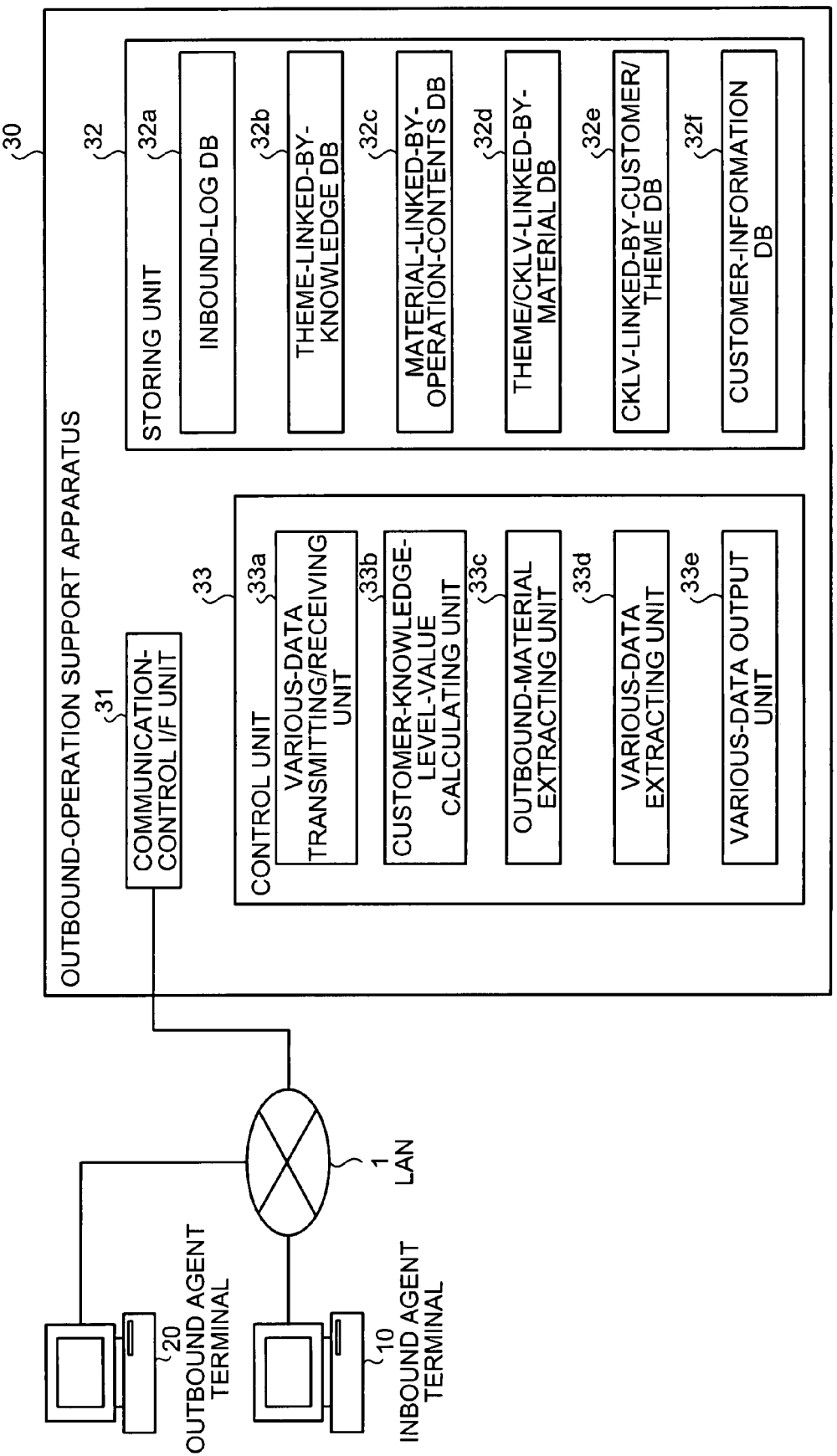
FIG. 2 is a block diagram of the outbound-operation support apparatus shown in FIG. 1 (CKLV means customer knowledge level value)

FIG. 2 is a block diagram of an outbound-operation support apparatus 30 according to the first embodiment. In the accompanying drawings, processing units necessary for realizing the outbound-operation support apparatus 30 are exclusively described and other processing units are omitted.

As shown in FIG. 2, the outbound-operation support apparatus 30 is communicably connected to an inbound agent terminal 10 used by an agent who performs the inbound operation and an outbound agent terminal 20 used by an agent who performs the outbound operation via a network such as a LAN 1. The outbound-operation support apparatus 30 includes a communication-control interface (I/F) unit 31, a storing unit 32, and a control unit 33. The communication-control I/F unit 31 controls a communication related to various information transmitted to and received from the inbound agent terminal 10 and the outbound agent terminal 20.

The storing unit 32 stores therein data and computer programs necessary for various processes performed by the control unit 33. Specifically, the storing unit 32 stores therein an inbound-log DB 32a, a theme-linked-by-knowledge DB 32b, a material-linked-by-operation-contents DB 32c, a theme/CKLV-linked-by-material DB 32d, a CKLV-linked-by-customer/theme DB 32e, and a customer information DB 32f.

The inbound-log DB 32a stores therein the inbound information that is a log of inbound operations received from the inbound agent terminal 10. Specifically, as shown in FIG. 3, the inbound-log DB 32a stores therein agent ID, customer ID, response date/time, response voice, response log, used search key, and used knowledge ID by associating with one another.

The theme-linked-by-knowledge DB 32b stores therein theme corresponding to knowledge used for the inbound operation. Specifically, as shown in FIG. 4, knowledge ID and theme related to the knowledge ID (i.e., a theme about a configuration of a personal computer (PC)) are stored in the theme-linked-by-knowledge DB 32b by associating with one another.

The material-linked-by-operation-contents DB 32c stores therein outbound material corresponding to the contents of the outbound operation. Specifically, as shown in FIG. 5, the outbound material suitable for the outbound operation is stored in the material-linked-by-operation-contents DB 32c in association with the contents of the outbound operation (i.e., a request of an introduction of a new PC product) received as a request from the outbound agent terminal 20.

The theme/CKLV-linked-by-material DB 32d stores therein the theme and the customer-knowledge-level value corresponding to each outbound material. Specifically, as shown in FIG. 6, the theme/CKLV-linked-by-material DB 32d stores therein theme related to each outbound material, customer-knowledge-level value stored in advance with respect to each operation-target customer, and success rate that indicates an effect of the outbound operation performed by using the outbound material obtained by, for example, dividing the number of completed contracts by the total number of the performed outbound operations, by associating each with the material recommended for the outbound operation.

The CKLV-linked-by-customer/theme DB 32e stores therein theme and the like used when the inbound operation corresponding to the customer is performed. Specifically, as shown in FIG. 7, theme and customer-knowledge-level value for the inbound operation are stored in the CKLV-linked-by-customer/theme DB 32e by associating each with the customer ID that uniquely identifies the customer.

The customer information DB 32f stores therein customer information such as customer name and customer contact information. Specifically, as shown in FIG. 8, the customer information such as the customer name and the customer contact information are stored in the customer information DB 32f by associating each with the customer ID.

The control unit 33 includes an internal memory for storing a predetermined control program, a program that determines various execution procedures, and necessary data and executes the various processes. The control unit 33 includes a various-data transmitting/receiving unit 33$a$, a customer-knowledge-level-value calculating unit 33$b$, an outbound-material extracting unit 33$c$, a various-data extracting unit 33$d$, and a various-data output unit 33$e$.

The various-data transmitting/receiving unit 33$a$ transmits and receives various data between the inbound agent terminal 10 and the outbound agent terminal 20. Specifically, the various-data transmitting/receiving unit 33$a$ receives the inbound information from the inbound agent terminal 10 via the communication control I/F unit 31 and stores the received inbound information in the inbound-log DB 32$a$. The various-data transmitting/receiving unit 33$a$ transmits the data related to the outbound material and the customer information received from the various-data output unit 33$e$ to the outbound agent terminal 20 via the communication-control I/F unit 31.

The customer-knowledge-level-value calculating unit 33$b$ calculates the customer-knowledge-level value upon receiving an instruction from an administrator via an input unit (not shown). The input unit can be a keyboard, a mouse, a microphone, and the like. Specifically, the customer-knowledge-level-value calculating unit 33$b$ acquires the knowledge ID of the knowledge ultimately used for the inbound operation from the inbound information stored in the inbound-log DB 32$a$ and extracts the theme corresponding to the knowledge ID from the theme-linked-by-knowledge DB 32$b$. Further, the customer-knowledge-level-value calculating unit 33$b$ calculates the word-level value and the time-level value, calculates the customer-knowledge-level value based on the word-level value and the time-level value by using an equation shown in FIG. 11, and stores the values in the corresponding databases such as the theme/CKLV-linked-by-material DB 32$d$ and the CKLV-linked-by-customer/theme DB 32$e$.

The method of calculating the word-level value is explained below. The customer-knowledge-level-value calculating unit 33$b$ extracts the theme based on the knowledge ID and extracts a query statement for the knowledge of the knowledge ID (see FIG. 13). The customer-knowledge-level-value calculating unit 33$b$ extracts a word used by a customer for explaining a failure or problem, from the inbound information stored in the inbound-log DB 32$a$. The word can be extracted by, for example, a voice recognition using word spotting for the voice of the customer who has explained the failure. Thereafter, the customer-knowledge-level-value calculating unit 33$b$ calculates the word level based on number of corresponding words between the extracted words used by the customer and the query statement of the knowledge. Specifically, the word level is calculated as a value obtained by dividing the number of the matched words by the number of the words in the query statement of the knowledge. After calculating the word level, the customer-knowledge-level-value calculating unit 33$b$ calculates a distribution of word levels by extracting a set of past responses by using a knowledge group associated with the same theme as that extracted based on the knowledge ID, and calculates a word-level value based on the distribution of the past word levels and the calculated word level. For example, ranking is made in the distributed past word levels, and when the calculated word level ranked within the lower one-third of the past word levels, the word-level value is calculated as "1". When the calculated word level is ranked within the upper one-third of the past word level, the word-level value is calculated as "3". Otherwise, the word-level value is calculated as "2".

Next, the method of calculating the time-level value is explained. For example, after calculating the word-level value, the customer-knowledge-level-value calculating unit 33$b$ extracts a explanation time spent by the customer for explaining a failure or problem, from the inbound information stored in the inbound-log DB 32$a$. The explanation time can be measured based on log information or a result of voice recognition. The customer-knowledge-level-value calculating unit 33$b$ extracts a set of the past responses by using the knowledge group associated with the same theme as that extracted based on the knowledge ID, calculates an average of the explanation time spent by the customer, and calculates a time level based on the calculated average of the explanation time spent by the customer. Specifically, the time level is calculated as a value obtained by dividing the average of the explanation time by the extracted explanation time. After the time level is calculated, the distribution of the explanation time spent by customers in the past responses is calculated. Thereafter, the time-level value is calculated based on the distribution of the past explanation time and the calculated time level. For example, a ranking is made in the distributed past time levels, and when the calculated time level is ranked within the lower one-third of the past time levels, the time-level value is calculated as "1". When the calculated time level is ranked within the upper one-third of the past time levels, the time-level value is calculated as "3". Otherwise, the time-level value is calculated as "2".

The outbound-material extracting unit 33$c$ receives a request from the outbound agent terminal 20 and extracts the proper outbound material. Specifically, upon receiving the contents of the outbound operation from an agent who is going to use the outbound agent terminal 20, the outbound-material extracting unit 33$c$ extracts a set of the outbound materials corresponding to the received contents of the operation from the material-linked-by-operation-contents DB 32$c$, and outputs data of the extracted outbound material to the various-data extracting unit 33$d$ and the various-data output unit 33$e$.

The various-data extracting unit 33$d$ extracts various data depending on data related to the set of the outbound materials received from the outbound-material extracting unit 33$c$. Specifically, the various-data extracting unit 33$d$ extracts the theme and the customer-knowledge-level value having the success rate of the outbound operation that is larger than a predetermined threshold value (i.e., more than 1%) determined in advance with respect to each outbound material as an effect of the outbound materials, for each of the received outbound materials.

The various-data extracting unit 33$d$ extracts each set of the customer IDs corresponding to each of the theme and the customer-knowledge-level value, for each of the extracted theme and the customer-knowledge-level value. Thereafter, the various-data extracting unit 33$d$ extracts the customer information corresponding to each of the customer IDs for each of the extracted sets of the customer IDs from the customer information DB 32$f$, and checks whether the processes related to the extraction of the customer information have been completed for all the outbound materials received from the outbound-material extracting unit 33$c$. When the processes for all the extracted outbound materials have been completed, the various-data extracting unit 33$d$ outputs each of the extracted data to the various-data output unit 33$e$.

It is possible to configure the various-data extracting unit 33$d$ to manage the date and time when the outbound operation was previously performed in association with the customer ID, and to avoid such a situation that the outbound operation is to be frequently performed to the same customer.

The various-data output unit 33$e$ outputs the outbound material and the customer information corresponding to the outbound operation. Specifically, the various-data output unit 33*e* associates each of the outbound materials received from the outbound-material extracting unit 33*c* with each of the customer information received from the various-data extracting unit 33*d* and outputs the associated outbound material and the customer information to the various-data transmitting/receiving unit 33*a*.

The outbound-operation support apparatus 30 can be realized by installing functions corresponding to the various-data transmitting/receiving unit 33*a*, the customer-knowledge-level-value calculating unit 33*b*, the outbound-material extracting unit 33*c*, the various-data extracting unit 33*d*, and the various-data output unit 33*e* onto an information processing apparatus such as a well-known personal computer or workstation.

Figure 9:
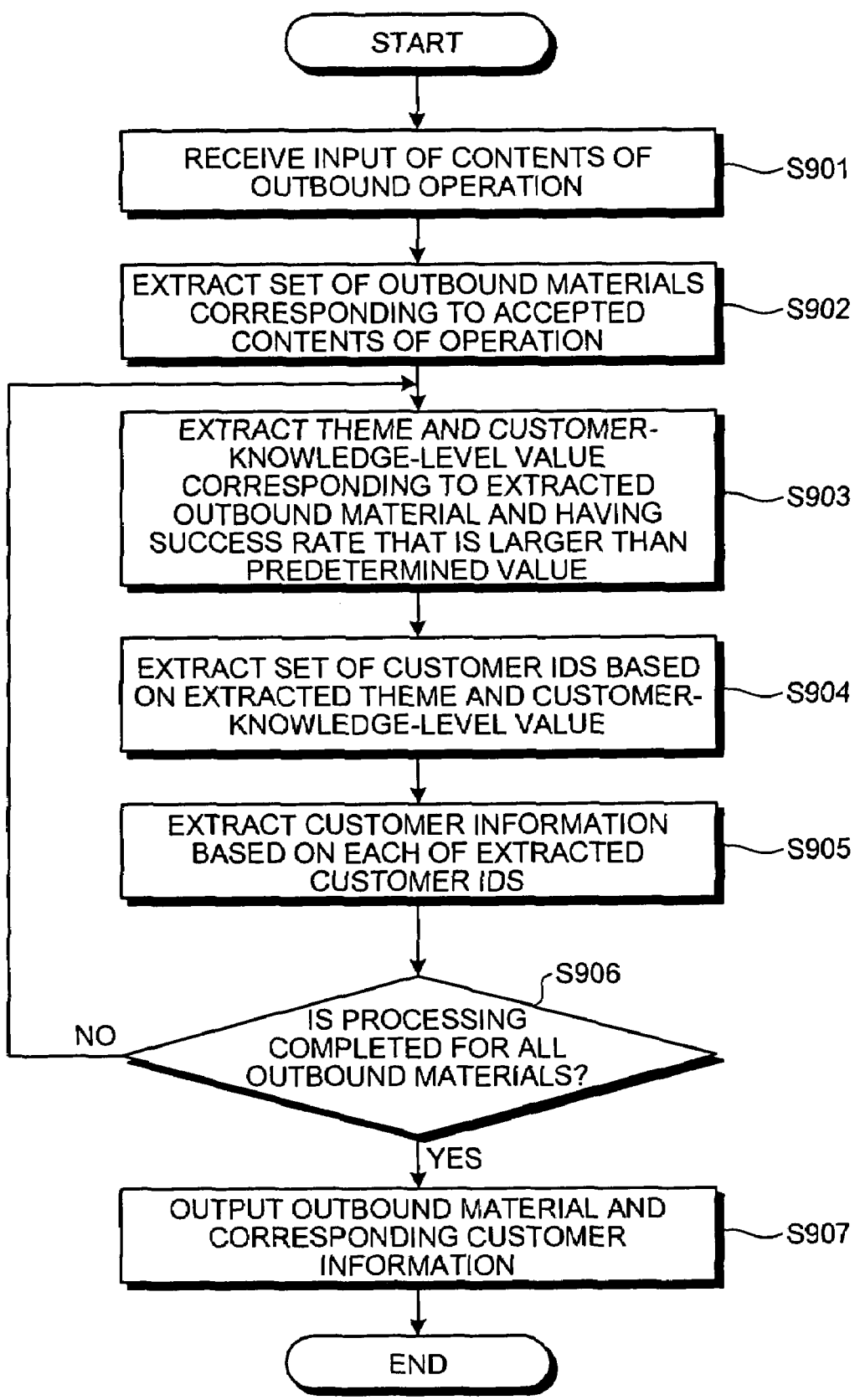
FIG. 9 is a flowchart of an optimal-material extracting processing performed by the outbound-operation support apparatus shown in FIG. 2.

An optimal-material extracting processing performed by the outbound-operation support apparatus 30 is explained below. FIG. 9 is a flowchart of the optimal-material extracting processing performed by the outbound-operation support apparatus 30.

As shown in FIG. 9, upon receiving the contents of the outbound operation for which the agent uses the outbound agent terminal 20 (step S901), the outbound-material extracting unit 33*c* extracts a set of the outbound materials corresponding to the received contents of the operation from the material-linked-by-operation-contents DB 32*c* (step S902). Thereafter, the outbound-material extracting unit 33*c* outputs the data of each of the extracted outbound materials to the various-data extracting unit 33*d* and the various-data output unit 33*e*.

The various-data extracting unit 33*d* extracts the theme and the customer-knowledge-level value having the success rate of the outbound operation that is larger than a predetermined threshold value (i.e., larger than 1%) previously stored with respect to each of the received outbound materials as an effect of the outbound material, from the theme/CKLV-linked-by-material DB 32*d* (step S903).

The various-data extracting unit 33*d* extracts each set of the customer IDs corresponding to the theme and the customer-knowledge-level value from the CKLV-linked-by-customer/theme DB 32*e*, for each of the extracted theme and customer-knowledge-level values (step S904). Thereafter, the various-data extracting unit 33*d* extracts each of the customer information corresponding to each of the customer IDs from the customer information DB 32*f*, for the extracted each set of the customer IDs (step S905).

The various-data extracting unit 33*d* checks whether the processes related to the extraction of the customer information have been completed for all the outbound materials received from the outbound-material extracting unit 33*c* (step S906). When the processes have not been completed for all the extracted outbound materials (No at step S906), the various-data extracting unit 33*d* continues to perform the processes to unprocessed outbound materials. On the other hand, when the processes have been completed for all the extracted outbound materials (Yes at step S906), the various-data extracting unit 33*d* outputs the extracted customer information to the various-data output unit 33*e*. The various-data output unit 33*e* associates each of the outbound materials received from the outbound-material extracting unit 33*c* with each of the customer information received from the various-data extracting unit 33*d* to be output to the various-data transmitting/receiving unit 33*a*. The various-data transmitting/receiving unit 33*a* transmits the data related to the outbound materials and the customer information received from the various-data output unit 33*e* to the outbound agent terminal 20 via the communication-control I/F unit 31.

Figure 10:
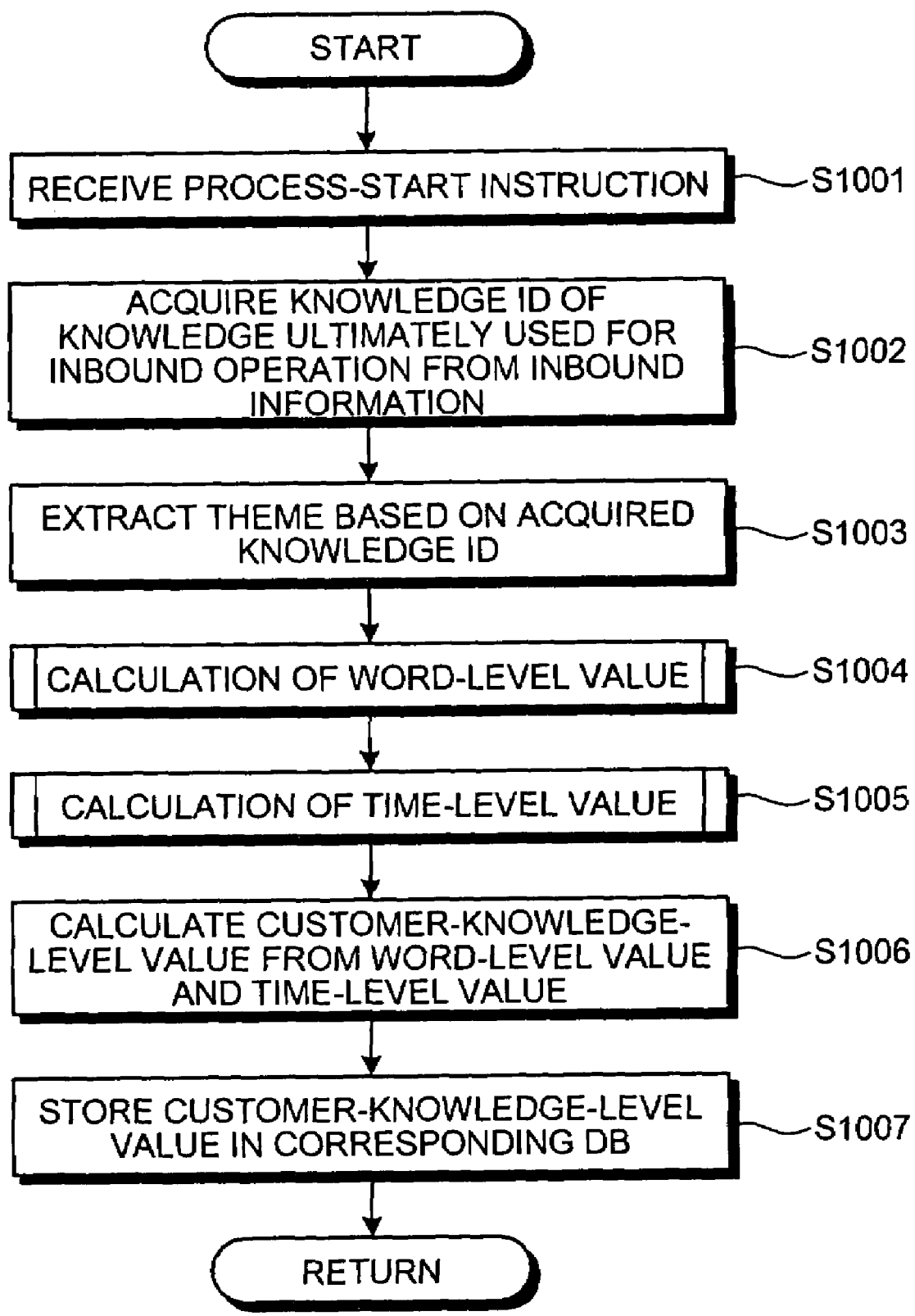
FIG. 10 is a flowchart of a customer-knowledge-level-value calculation processing performed by the outbound-operation support apparatus shown in FIG. 2.

A customer-knowledge-level-value calculation processing performed by the outbound-operation support apparatus 30 is explained below. FIG. 10 is a flowchart of the customer-knowledge-level-value calculation processing according to the first embodiment.

As shown in FIG. 10, upon receiving a process-start instruction from the administrator (step S1001), the customer-knowledge-level-value calculating unit 33*b* acquires the knowledge ID corresponding to the knowledge ultimately used for the inbound from the inbound information stored in the inbound-log DB 32*a* (step S1002), and extracts the theme corresponding to the knowledge ID from the theme-linked-by-knowledge DB 32*b* (step S1003).

The customer-knowledge-level-value calculating unit 33*b* calculates the word-level value and the time-level value (steps S1004 and S1005), calculates the customer-knowledge-level value from the word-level value and the time-level value based on a calculation equation exemplary shown in FIG. 11 (step S1006), and stores the calculated customer-knowledge-level value in the corresponding databases (the theme/CKLV-linked-by-material DB 32*d* and the CKLV-linked-by-customer/theme DB 32*e*) (step S1007).

Figure 12:
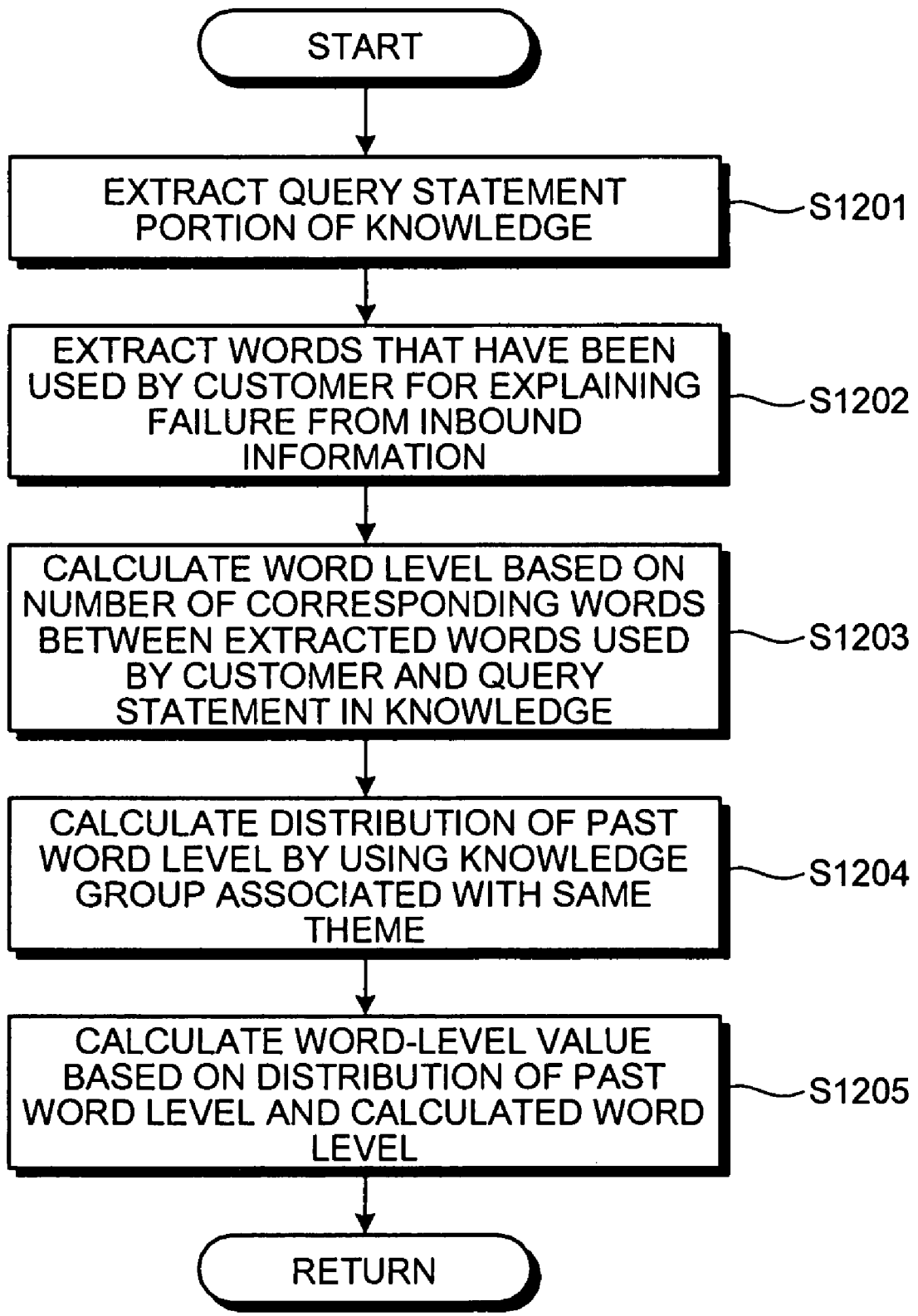
FIG. 12 is a flowchart of a word-level-value calculation processing performed by the outbound-operation support apparatus shown in FIG. 2.

A word-level-value calculation processing at step S1004 is explained. FIG. 12 is a flowchart of the word-level-value calculation processing performed by the outbound-operation support apparatus 30.

After extracting the theme based on the knowledge ID (see step S1003 in FIG. 10), the customer-knowledge-level-value calculating unit 33*b* executes the word-level-value calculation processing as shown in FIG. 12. The customer-knowledge-level-value calculating unit 33*b* extracts a query statement (see FIG. 13) for the knowledge corresponding to the acquired knowledge ID (step S1201), and extracts words used by the customer for explaining a failure or problem from the inbound information stored in the inbound-log DB 32*a* (step S1202).

The customer-knowledge-level-value calculating unit 33*b* calculates the word level from the number of corresponding words between the extracted words used by the customer and the query statement of the knowledge (step S1203). Specifically, the word level is calculated by dividing the number of the matched words by the number of the words in the query statement of the knowledge. After calculating the word level, the customer-knowledge-level-value calculating unit 33*b* calculates a distribution of the word levels by extracting the set of the past responses by using the knowledge group associated with the same theme as that extracted based on the knowledge ID (see step S1003 in FIG. 10) (step S1204).

The customer-knowledge-level-value calculating unit 33*b* calculates the word-level value based on the distribution of the past word levels and the calculated word level (step S1205). Specifically, the customer-knowledge-level-value calculating unit 33*b* creates a ranking in the distributed past word levels to calculate the word-level value as "1" when the calculated word level is ranked within the lower one-third of the past word levels, as "3" when the calculated word level is ranked within the upper one-third of the past word levels, and as "2" when the calculated word level is ranked neither within the lower one-third nor within the upper one-third.

Figure 14:
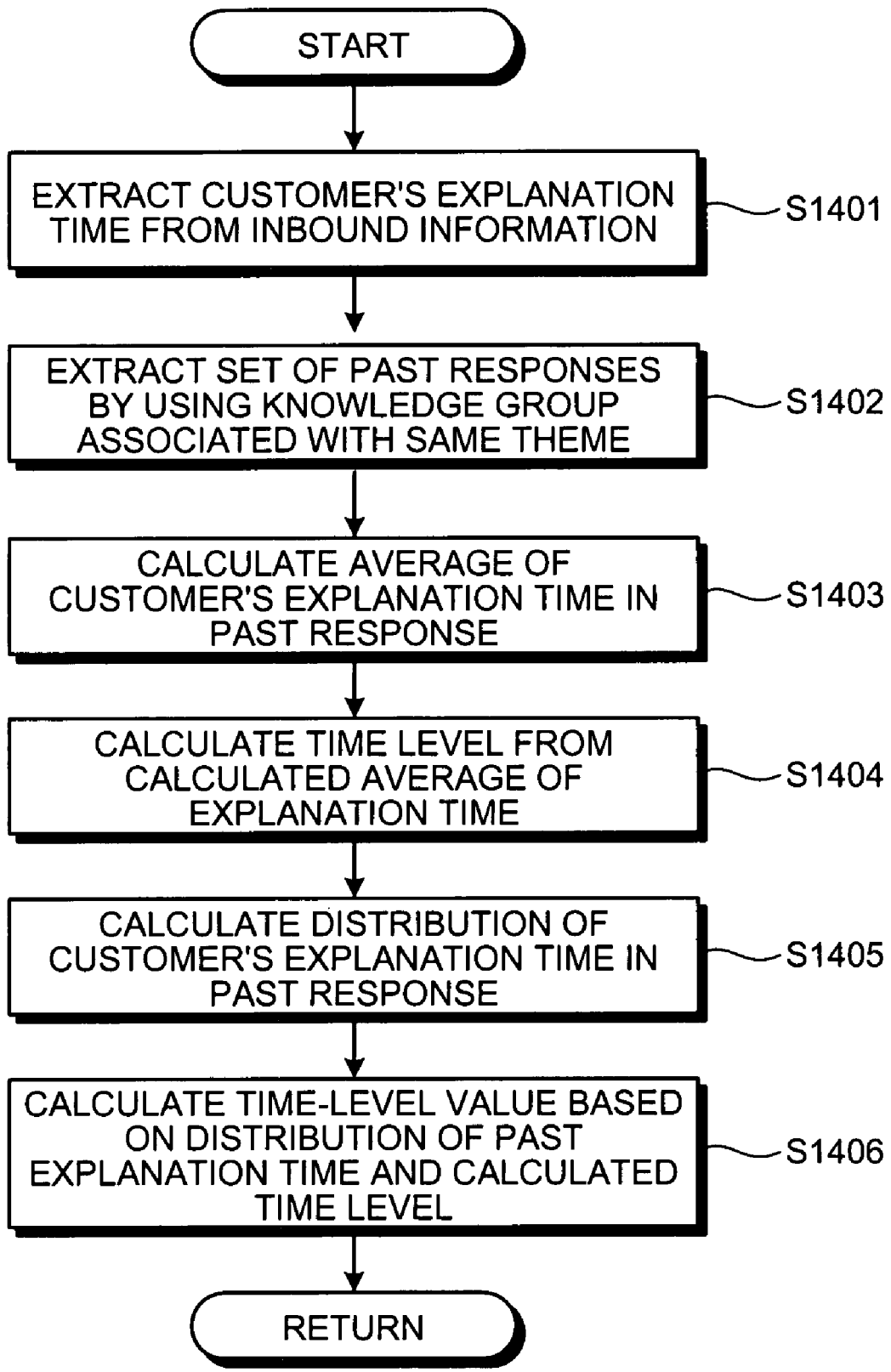
FIG. 14 is a flowchart of a time-level-value calculation processing performed by the outbound-operation support apparatus shown in FIG. 2.

A time-level-value calculation processing at step S1005 is explained. FIG. 14 is a flowchart of the time-level-value calculation processing performed by the outbound-operation support apparatus 30.

After completing the word-level-value calculation processing (see step S1004 in FIG. 10), the customer-knowledge-level-value calculating unit 33*b* executes the time-level-value calculation processing. The customer-knowledgelevel-value calculating unit 33b extracts an explanation time spent by the customer for explaining a failure or problem from the inbound information stored in the inbound-log DB 32a (step S1401). Thereafter, the customer-knowledge-level-value calculating unit 33b extracts the set of the past responses by using the knowledge group associated with the same theme as that extracted based on the knowledge ID (see step S1003 in FIG. 10) (step S1402), and calculates the average of the explanation time spent by the customer (step S1403).

The customer-knowledge-level-value calculating unit 33b calculates the time level from the calculated average of the explanation time spent by the customer (step S1404). Specifically, the time level is calculated by dividing the average of the explanation time by the extracted explanation time. After calculating the time level, the customer-knowledge-level-value calculating unit 33b calculates a distribution of the explanation time spent by the customer in the past response (step S1405).

Thereafter, the customer-knowledge-level-value calculating unit 33b calculates the time-level value based on the distribution of the past explanation time and the calculated time level (step S1406). Specifically, the customer-knowledge-level-value calculating unit 33b creates a ranking in the distributed past time levels to calculate the time-level value as "1" when the calculated time level is ranked within the lower one-third of the past time levels, as "3" when the calculated time level is ranked within the upper one-third of the past time levels, and as "2" when the calculated time level is ranked neither within the lower one-third nor within the upper one-third.

Thus, according to the first embodiment, the contents of the outbound operation and the outbound material used for the outbound operation are associated with one another. The related theme related to the outbound material, the customer-knowledge-level value stored with respect to each operation-target customer, and the success rate obtained by performing the outbound operation using the outbound material are stored in each of the databases, by associating each with the outbound material. The theme and the customer-knowledge-level value for the performed inbound operation are stored in each of the databases, by associating each with the customer IDs that uniquely identifies the customer to whom the inbound operation has been performed. The customer information related to the customer (i.e., the customer name and the customer contact information) is stored in the database by associating them with the customer IDs. When the input of the contents of the outbound operation is received, the outbound material corresponding to the contents of the outbound operation is extracted. The related theme and the customer-knowledge-level value having the success rate of the outbound operation that is larger than the predetermined threshold value are extracted from among the related themes and the customer-knowledge-level values based on the extracted outbound material. The customer ID is extracted based on the extracted related theme and the customer-knowledge-level value. The customer name and the customer contact information are extracted based on the extracted customer ID. Thereafter, the extracted outbound material, the customer name, and the customer contact information are output. Therefore, it is possible to support the outbound operation to be performed by the agent, by outputting information related to the material used for the outbound operation and the contact address of a potential customer to whom a high success rate can be expected, that is, the outbound operation is likely to be success, when the outbound operation is performed by using the outbound material. As a result, it is possible to sufficiently improve the customer acquisition rate.

Furthermore, according to the first embodiment, the customer-knowledge-level value calculated based on the information obtained through the inbound operation is stored in each of the databases. Because the customer-related information that is hardly acquired can be obtained by taking advantage of the performance of the inbound operation, and the customer-knowledge-level value calculated based on the obtained information can be used for outputting the outbound material and the customer contact information, it is possible to effectively perform the outbound operation.

Moreover, according to the first embodiment, the word level of the customer is calculated based on a usage rate of technical words included in the contents of the conversation when the customer asks questions in the inbound operation, that is, the word level is calculated as high when the customer frequently uses the technical words. The time level of the customer is calculated based on a speaking time of the customer when the customer explained the question in the inbound operation, that is, the time level is calculated as high if the speaking time is less than the average when the customer explained the question. The customer-knowledge-level value is calculated based on the calculated world level and the time level. Accordingly, it is possible to relatively observe an effect of each of the words on the knowledge level depending on the time and the season in which the word are used, and therefore, it is possible to more reliably calculate the customer knowledge level with lower costs than a way of calculating a value related to the customer knowledge level by using dictionary data and the like.

In the first embodiment, it is explained that the customer-knowledge-level value is calculated based on the word-level value and the time-level value. However, the present invention is not thus limited and it is acceptable to calculate the customer-knowledge-level value based on the word level, the time level, and an understanding level, by calculating the understanding level of the customer based on the response of the customer for answering in the inbound operation (i.e., a feature of the pitch power obtained when the customer makes a brief response), and attribute information of the agent (i.e., a using word, a speaking time, and a knowledge level of the agent).

An understanding-level-value calculation processing according to a second embodiment is explained below with reference to the FIGS. 15 to 19. FIG. 15 is an example of the contents of an agent skill DB according to the second embodiment. FIG. 16 is a flowchart of the understanding-level-value calculation processing performed by the outbound-operation support apparatus 30. FIG. 17 is an example of an equation for calculating a correction value by the outbound-operation support apparatus 30 according. FIG. 18 is an example of an equation for calculating an understanding-level value by the outbound-operation support apparatus 30 according. FIG. 19 is an example of an equation for calculating a customer-knowledge-level value by the outbound-operation support apparatus 30 according.

After completing the time-level-value calculation processing (see step S1005 in FIG. 10), the customer-knowledge-level-value calculating unit 33b executes the understanding-level-value calculation processing. As shown in FIG. 16, the customer-knowledge-level-value calculating unit 33b extracts the set of the past responses by using the knowledge group associated with the same theme as that extracted based on the knowledge ID (see step S1003 in FIG. 10) (step S1601).

After extracting the set of the past responses, the customer-knowledge-level-value calculating unit 33b extracts words used by the agent for an explanation from the inbound information stored in the inbound-log DB 32a (step S1602). Thereafter, the customer-knowledge-level-value calculating unit 33b extracts words in a document written in an agent log related to all the agents from the inbound information stored in the inbound-log DB 32a (step S1603).

The customer-knowledge-level-value calculating unit 33b calculates the word level of the agent based on the number of the matched words between the words used by the agent for the explanation and the words in the document written in the agent log, which are extracted from the inbound information, and the total number of the words in the document written in the agent log (step S1604). Specifically, similarly to the calculation of the word level explained in the first embodiment, the word level of the agent is calculated by dividing the number of the matched words by the total number of the words in the document written in the agent log.

The customer-knowledge-level-value calculating unit 33b extracts the set of the past responses by using the knowledge group associated with the same theme and calculates the distribution of the word level of the agent (step S1605). Specifically, similarly to the calculation of the word-level value explained in the first embodiment, the customer-knowledge-level-value calculating unit 33b makes a ranking in the distributed past word levels of the agent to calculate the word-level value of the agent used when the agent explained in the past (step S1606). For example, similarly to the calculation of the word-level value explained in the first embodiment, a ranking is made in the distributed past word levels to calculate the word-level value of the agent as "1" when the calculated word level is ranked within the lower one-third of the past word levels, as "3" when the calculated word level is ranked within the upper one-third, and as "2" when the calculated word level is ranked neither within the lower one-third nor within the upper one-third.

The customer-knowledge-level-value calculating unit 33b extracts an explanation time spent by the agent from the inbound information stored in the inbound-log DB 32a (step S1607). After extracting the explanation time spent by the agent, the customer-knowledge-level-value calculating unit 33b extracts the set of the past responses by using the knowledge group associated with the same theme as that extracted based on the knowledge ID (see S1003 in FIG. 10), and calculates the average of the explanation time of the agent (step S1608).

The customer-knowledge-level-value calculating unit 33b calculates a time-level value of the explanation time of the agent (step S1609). Specifically, similarly to the calculation of the time-level value explained in the first embodiment, the time level is calculated by dividing the average of the explanation time of the agent by the extracted explanation time of the agent. After the time level is calculated, the distribution of the explanation time of the agents in the past responses is calculated. Thereafter, a ranking is made in the distributed past time levels to calculate the time-level value of the customer. For example, when the calculated time level is ranked within the lower one-third of the distributed past time levels, the time-level value is calculated as "1", while when the calculated time level is ranked within the upper one-third of the past time levels, the time-level value is calculated as "3". Otherwise, the time-level value is calculated as "2".

The customer-knowledge-level-value calculating unit 33b extracts a pitch power of a customer's brief response and interjection indicating that the customer does not understand the explanation given by the agent (i.e., features of the pitch power unique to a beginner) from the customer's response to the explanation made by the agent (step S1610). After extracting the feature of the pitch power of the brief response and interjection of the customer, the customer-knowledge-level-value calculating unit 33b calculates the average of the number per unit time for the pitch power indicating that the customer does not understand the explanation made by the agent from the set of the past responses (step S1611). After calculating the average of the pitch power, the customer-knowledge-level-value calculating unit 33b calculates a customer-response level based on the average of the past pitch power and the average of the pitch power extracted this time, and calculates the customer-response-level value for the customer-response level (step S1612). Specifically, the customer-response level is calculated by dividing the average of the past pitch power by the average of the pitch power extracted this time. For example, a ranking is made in the distributed past customer-response levels to calculate the customer-response-level value as "1" when the calculated customer-response level is ranked within the lower one-third of the past customer-response levels in the distribution, as "3" when the calculated customer-response level is ranked within the upper one-third, and as "2" when the calculated customer-response level is ranked neither within the lower one-third nor within the upper one-third.

The customer-knowledge-level-value calculating unit 33b acquires a skill level of the responding agent (L) from an agent skill DB (see FIG. 15) installed in the storing unit 32 (step S1613). The customer-knowledge-level-value calculating unit 33b extracts each of the word level, the time level, the customer-response level, and the skill level of the agent from the sets of the past responses (step S1614). Thereafter, the customer-knowledge-level-value calculating unit 33b calculates a correction value based on a calculation equation shown in FIG. 17, based on the skill level of the agent (step S1615), and calculates the understanding-level value based on a calculation equation shown in FIG. 18, by using the word-level value of the agent, the time-level value of the agent, the customer-response-level value, and the correction value (step S1616).

After calculating the understanding-level value, the customer-knowledge-level-value calculating unit 33b calculates the customer-knowledge-level value based on a calculation equation shown in FIG. 19, by using the word-level value, the time-level value, and the understanding-level value.

As described above, according to the second embodiment, the understanding level of the customer is calculated based on the response of the customer when the customer answers in the inbound operation (i.e., the feature of the pitch power of the response of the customer), and the attribute information of the agent (i.e., the word level and the time level of the agent). The customer-knowledge-level value is calculated based on the word level, the time level, and the understanding level. Therefore, it is possible to more specifically calculate the knowledge level of the customer.

It is acceptable to configure the first and the second embodiments so that the log of the outbound operation is stored in advance, and the success rate that indicates the effect obtained when the outbound operation is performed by using the outbound material is to be calculated accordingly. A configuration and an execution procedure of an outbound-operation support apparatus according to a third embodiment of the present invention is explained below and the effect of the third embodiment will be sequentially described.

Figure 20:
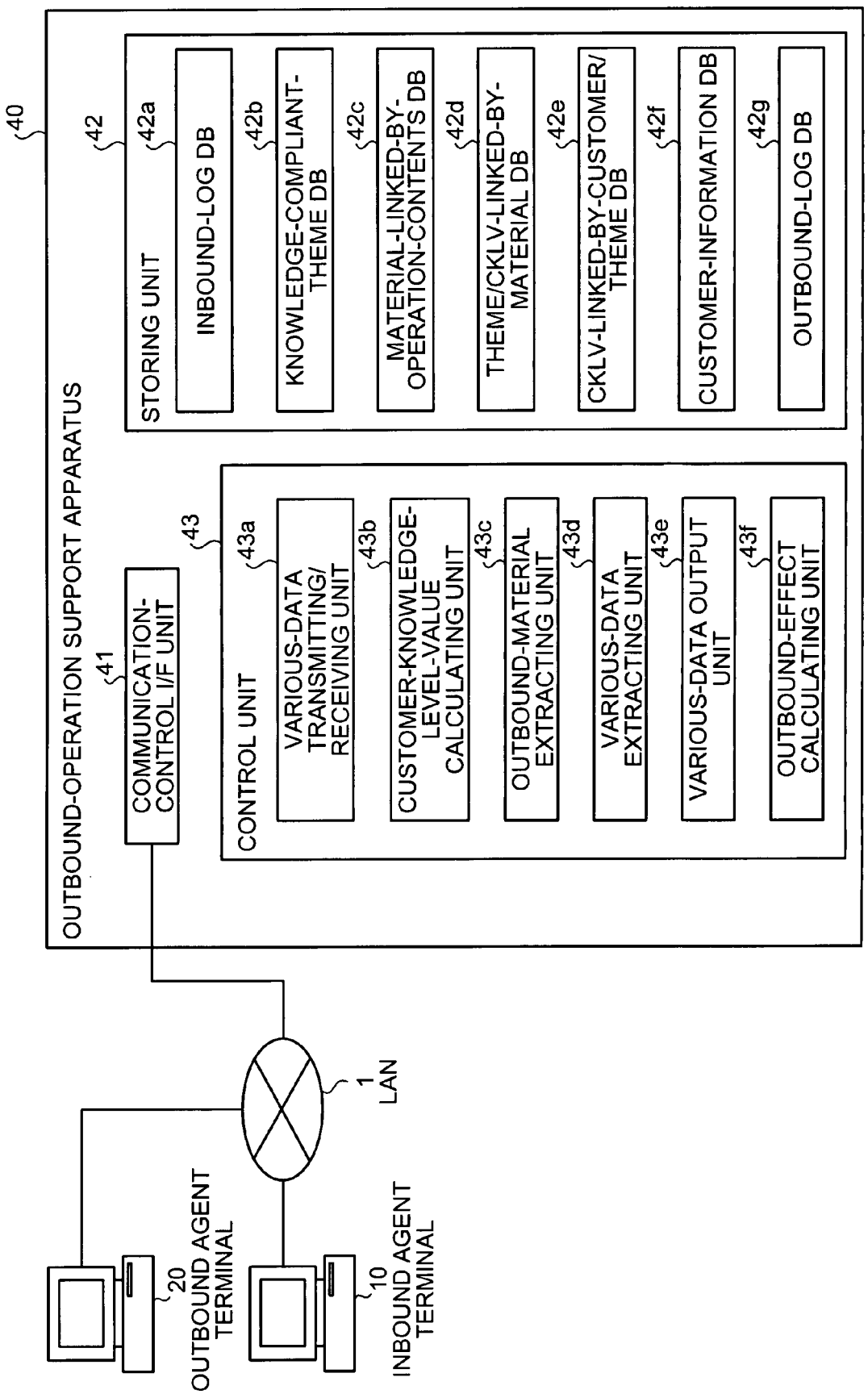
FIG. 20 is a block diagram of an outbound-operation support apparatus according to a third embodiment of the present invention (CKLV means customer knowledge level value)

FIG. 20 is a block diagram of an outbound-operation support apparatus 40. The outbound-operation support apparatus 40 has basically the same configuration as that of the outbound-operation support apparatus 30 in the first embodiment. Namely, the outbound-operation support apparatus 40 includes a communication-control I/F unit 41 instead of the communication-control I/F unit 31, a storing unit 42 instead of the storing unit 32, and a control unit 43 instead of the control unit 33. The storing unit 42 includes an inbound-log DB 42a instead of the inbound-log DB 32a, a theme-linked-by-knowledge DB 42b instead of the theme-linked-by-knowledge DB 32b, a material-linked-by-operation-contents DB 42c instead of the material-linked-by-operation-contents DB 32c, a theme/CKLV-linked-by-material DB 42d instead of the theme/CKLV-linked-by-material DB 32d, a CKLV-linked-by-customer/theme DB 42e instead of the CKLV-linked-by-customer/theme DB 32e, and a customer-information DB 42f instead of the customer information DB 32f in the storing unit 32. The control unit 43 includes a various-data transmitting/receiving unit 43a instead of the various-data transmitting/receiving unit 33a, a customer-knowledge-level-value calculating unit 43b instead of the customer-knowledge-level-value calculating unit 33b, an outbound-material extracting unit 43c instead of the outbound-material extracting unit 33c, a various-data extracting unit 43d instead of the various-data extracting unit 33d, and a various-data output unit 43e instead of the various-data output unit 33e. On the other hand, the outbound-operation support apparatus 40 uniquely includes an outbound-log DB 42g and an outbound-effect calculating unit 43f.

The outbound-log DB 42g in the storing unit 42 stores therein the outbound information that is log information about the outbound operation performed by using the outbound agent terminal 20. Specifically, as shown in FIG. 21, the outbound-log DB 42g is configured to store therein contents of the outbound operation, an outbound material used for the outbound operation, date and time when the outbound operation is performed, and a result of the outbound operation, by associating each with a customer ID to the customer with which the outbound operation has been performed.

The outbound-effect calculating unit 43f receives an instruction from an administrator and calculates the success rate of the outbound operation, which indicates an effect obtained through the outbound operation, with respect to each related theme and each customer-knowledge-level value associated with the outbound material.

Specifically, the outbound-effect calculating unit 43f extracts the customer ID to the customer with which the inbound operation has been performed from the inbound-log DB 42a, extracts the customer ID to the customer with which the outbound operation has been performed from the outbound-log DB 42g, and extracts the customer ID to the customer with which the both inbound operation and the outbound operation have been performed, by matching the extracted customer IDs one another.

The outbound-effect calculating unit 43f extracts the theme and the customer-knowledge-level value from the CKLV-linked-by-customer/theme DB 42e based on the extracted customer ID. The outbound-effect calculating unit 43f also extracts the used outbound material and an outbound result from the outbound-log DB 42g based on the extracted customer ID.

Thereafter, the outbound-effect calculating unit 43f calculates the effect obtained through the outbound operation with respect to each related theme and each customer-knowledge-level value associated one another with each of the outbound materials. Namely, the effects obtained when the outbound operation is performed by using a specific material in relation to a specific theme for a customer with a specific knowledge level is calculated. Specifically, the effect of the outbound operation is calculated by dividing the number of completed contracts by the total number of performed outbound operations, for each of the outbound materials with respect to each theme and each customer-knowledge-level value.

The outbound-effect calculating unit 43f stores the calculated effect of the outbound operation in the corresponding theme/CKLV-linked-by-material DB 42d.

Figure 22:
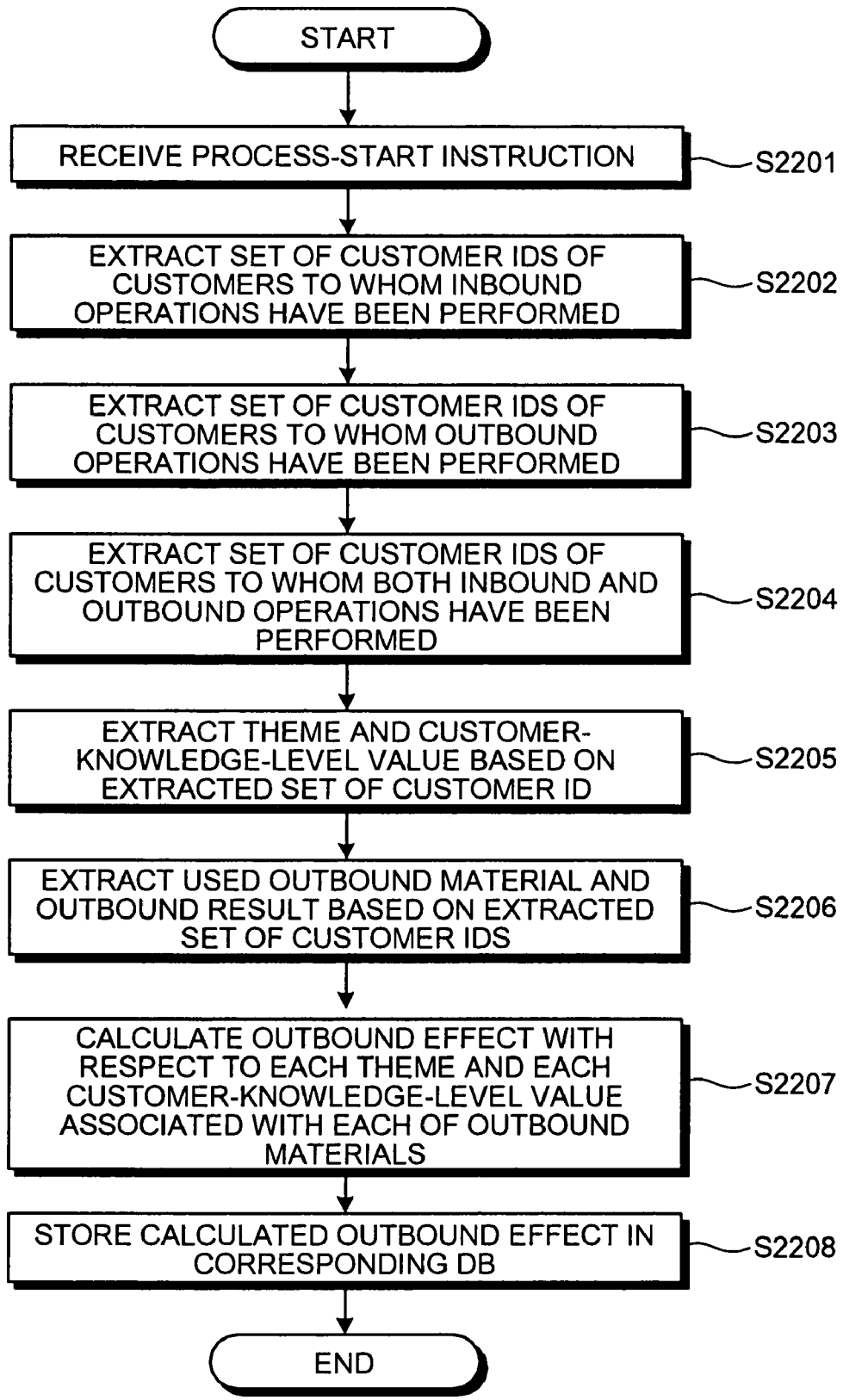
FIG. 22 is a flowchart of an outbound-effect calculation processing performed by the outbound-operation support apparatus shown in FIG. 20.

An outbound-effect calculation processing performed by the outbound-operation support apparatus 40 is explained below. FIG. 22 is a flowchart of the outbound-effect calculation processing performed by the outbound-operation support apparatus 40.

As shown in FIG. 22, upon receiving a process-start instruction from an administrator (step S2201), the outbound-effect calculating unit 43f extracts the customer ID to the customer with which the inbound operation has been performed from the inbound-log DB 42a (step S2202), extracts the customer ID to the customer with which the outbound operation has been performed from the outbound-log DB 42g (step S2203), and extracts the customer ID to the customer with which both the inbound operation and the outbound operation have been performed by matching the extracted customer IDs one another (step S2204).

Thereafter, the outbound-effect calculating unit 43f extracts the theme and the customer-knowledge-level value from the CKLV-linked-by-customer/theme DB 42e, based on the extracted customer ID (step S2205). The outbound-effect calculating unit 43f extracts the used outbound material and the outbound result from the outbound-log DB 42g, based on the extracted customer ID (step S2206).

The outbound-effect calculating unit 43f calculates the effect obtained through the outbound operation with respect to each related theme and each customer-knowledge-level value associated with each of the outbound materials (step s2207). Specifically, the effect of the outbound operation is calculated by dividing the number of the successfully completed contracts by the total number of the performed outbound operations with respect to each theme and each customer-knowledge-level value.

The outbound-effect calculating unit 43f stores the calculated effect of the outbound operation in the corresponding theme/CKLV-linked-by-material DB 42d (step S2208).

As described above, according to the third embodiment, the contents of the outbound operation, the outbound material used for the outbound operation, the date and time when the outbound operation is performed, and the result of the outbound operation are stored as a log in the databases, by associating each with the customer ID to the customer with which the outbound operation is performed, at the time of performing the outbound operation. The success rate of the outbound operation is calculated with respect to each related theme and each customer-knowledge-level value associated with the outbound material based on the stored outbound log, and thereafter, the calculated success rate is stored in the database. Accordingly, the result of the outbound operation can be fed back when the outbound material and the customer information is output, and therefore, it is possible to properly support the outbound operation to be performed by the agent. As a result, it is possible to sufficiently improve the customer acquisition rate.

The present invention in its broader aspects is not limited to the specific details and representative embodiments shown and described herein. Accordingly, various modifications can be made without departing from the spirit or scope of the general inventive concept as defined by the appended claims and their equivalents. The other embodiment of the present invention will be explained below.

The constituent elements of the outbound-operation support apparatus 30 shown in FIG. 2 and the outbound-operation support apparatus 40 shown in FIG. 20 are based on functional concepts. The constituent elements do not necessarily have to be physically arranged in the way shown in the drawings. In other words, the specific mode in which the outbound-operation support apparatuses 30 and 40 are distributed and integrated is not limited to the ones shown in the drawing. For example, in the outbound-operation support apparatus 30, the inbound-log DB 32a and the theme-linked-by-knowledge DB 32b can be integrated, the material-linked-by-operation-contents DB 32c, the theme/CKLV-linked-by-material DB 32d, and the CKLV-linked-by-customer/theme DB 32e can be integrated, and the outbound-material extracting unit 33c, the various-data extracting unit 33d, and the various-data output unit 33e can be integrated. Similarly, in the outbound-operation support apparatus 40, the inbound-log DB 42a and the theme-linked-by-knowledge DB 42b can be integrated, the material-linked-by-operation-contents DB 42c, the theme/CKLV-linked-by-material DB 42d, and the CKLV-linked-by-customer/theme DB 42e can be integrated, and the outbound-material extracting unit 43c, the various-data extracting unit 43d, and the various-data output unit 43e can be integrated. In other words, a part or all of the apparatuses can be distributed or integrated functionally or physically in any arbitrary units, according to various loads and the status of use. Further, a part or all of the processing functions, such as the optimal-material-extraction processing function shown in FIG. 9 and the customer-knowledge-level value calculation function shown in FIG. 10, offered by the outbound-operation support apparatuses 30 and 40 can be realized by a CPU and a program analyzed and executed by the CPU, or may be realized as hardware with wired logic.

Figure 23:
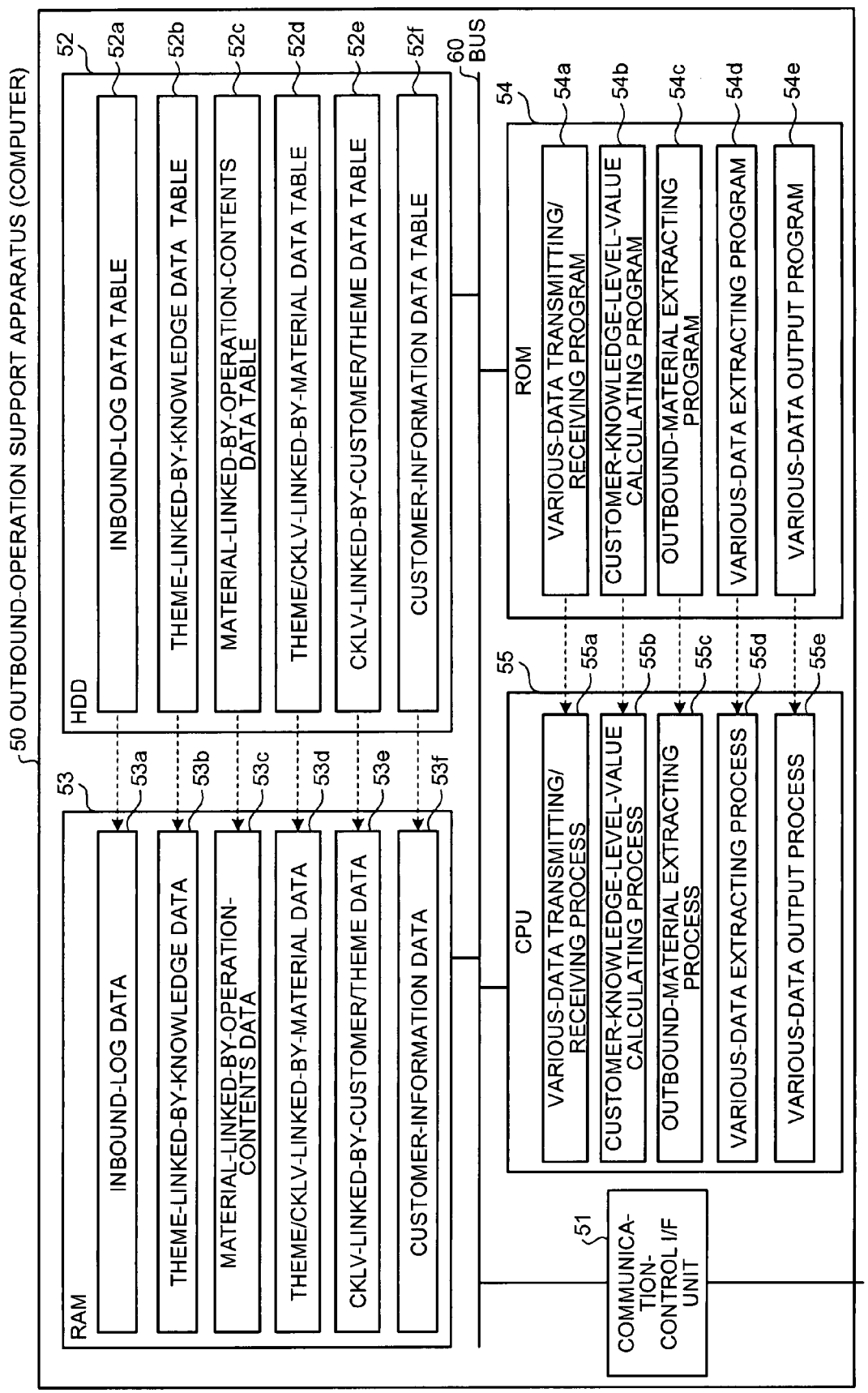
FIG. 23 is a block diagram of a computer that executes an outbound-operation support program according to a fourth embodiment of the present invention.

Each of the processings in relation to the outbound-operation support apparatus 30 explained in the first and the second embodiments (see FIGS. 9, 10, 12, 14, and 16) and each of the processings in relation to the outbound-operation support apparatus 40 explained in the third embodiment (see FIG. 22) can be realized by executing predetermined programs by a computer system such as a personal computer or a workstation. An example of a computer that executes an outbound-operation support program that includes the same functions as those explained in the first, the second, and the third embodiments will be explained below. FIGS. 23 and 24 are block diagrams of the computer that executes the outbound-operation support program according to a fourth and a fifth embodiments of the present invention.

As shown in FIG. 23, a computer 50 serving as an outbound-operation support apparatus according to the fourth embodiment includes a communication-control I/F unit 51, an HDD 52, a RAM 53, a ROM 54, and a CPU 55, by connecting one another via a bus 60. The communication-control I/F unit 51 corresponds to the communication-control I/F unit 31 shown in FIG. 2.

The ROM 54 stores therein the outbound-operation support program that realizes the same functions as those in the outbound-operation support apparatus 30 shown in the first and the second embodiments. In other words, as shown in FIG. 23, a various-data transmitting/receiving program 54a, a customer-knowledge-level-value calculating program 54b, an outbound-material extracting program 54c, a various-data extracting program 54d, and a various-data output program 54e are stored in advance in the ROM 54. The programs 54a to 54e can accordingly be integrated or distributed, similarly to each of the constituent elements of the outbound-operation support apparatus 30 shown in FIG. 2. Further, the ROM 54 can be replaced by a nonvolatile RAM.

When the CPU 55 reads out and executes the programs 54a to 54e, as shown in FIG. 23, the program 54a function as a various-data transmitting/receiving process 55a, the program 54b as a customer-knowledge-level-value calculating process 55b, the program 54c as an outbound-material extracting process 55c, the program 54d as a various-data extracting process 55d, and the program 54e as a various-data output process 55e. The process 55a corresponds to the various-data transmitting/receiving unit 33a, the process 55b to the customer-knowledge-level-value calculating unit 33b, the process 55c to the outbound-material extracting unit 33c, the process 55d to the various-data extracting unit 33d, and the process 55e to the various-data output unit 33e shown in FIG. 2.

The HDD 52 stores therein, as shown in FIG. 23, an inbound-log data table 52a, a theme-linked-by-knowledge data table 52b, a material-linked-by-operation-contents data table 52c, a theme/CKLV-linked-by-material data table 52d, a CKLV-linked-by-customer/theme data table 52e, and a customer-information data table 52f. The inbound-log data table 52a corresponds to the inbound-log DB 32a shown in FIG. 2, the theme-linked-by-knowledge data table 52b to the theme-linked-by-knowledge DB 32b, the material-linked-by-operation-contents data table 52c to the material-linked-by-operation-contents DB 32c, the theme/CKLV-linked-by-material data table 52d to the theme/CKLV-linked-by-material DB 32d, the CKLV-linked-by-customer/theme data table 52e to the CKLV-linked-by-customer/theme DB 32e, and the customer-information data table 52f to the customer-information DB 32f. The CPU 55 reads out inbound-log data 53a from the inbound-log data table 52a, theme-linked-by-knowledge data 53b from the theme-linked-by-knowledge data table 52b, material-linked-by-operation-contents data 53c from the material-linked-by-operation-contents data table 52c, theme/CKLV-linked-by-material data 53d from the theme/CKLV-linked-by-material data table 52d, customer/theme-correspondence-knowledge-level value data 53e from the CKLV-linked-by-customer/theme data table 52e, and customer information data 53f from the customer-information data table 52f to store in the RAM 53. Thereafter, the CPU 55 executes the inbound-log data 53a, the theme-linked-by-knowledge data 53b, the material-linked-by-operation-contents data 53c, the theme/CKLV-linked-by-material data 53d, the customer/theme-correspondence-knowledge-level value data 53e, and the customer information data 53f stored in the RAM 53 to execute the outbound-operation support process.

Each of the programs 54a to 54e is not necessarily stored in advance in the ROM 54. For example, each of the programs 54a to 54e can be stored in a physical removable medium such as a flexible disk, a compact disk-read only memory (CD-ROM), a digital versatile disk (DVD), a magneto optical disk, or an integrated circuit (IC) card. Further, each of the programs 54a to 54e can be stored in a built-in physical medium including an HDD installed inside or outside the computer 50. Moreover, it is acceptable to store each of the programs in the other computer or a server that is connected to the computer 50 via a communication line, the Internet, a LAN, or a wide area network (WAN) so that the computer 50 can read out and execute each of the programs.

As shown in FIG. 24, a computer 70 serving as an outbound-operation support apparatus according to the fifth embodiment of the present invention is configured to include a communication-control I/F unit 71, an HDD 72, a RAM 73, a ROM 74, and a CPU 75, by connecting one another via a bus 80. The communication-control I/F unit 71 corresponds to the communication-control I/F unit 41 shown in FIG. 20.

The ROM 74 stores therein the outbound-operation support program that realizes the same functions as those in the outbound-operation support apparatus explained in the third embodiment. In other words, as shown in FIG. 24, a various-data transmitting/receiving program 74a, a customer knowledge-level-value calculating program 74b, an outbound-material extracting program 74c, a various-data extracting program 74d, a various-data output program 74e, and an outbound-effect calculating program 74f are stored in advance in the ROM 74. The programs 74a to 74e can accordingly be integrated or distributed, similarly to each of the constituent elements of the outbound-operation support apparatus 40 shown in FIG. 20. Further, the ROM 54 can be replaced by a nonvolatile RAM.

When the CPU 75 reads out and executes the programs 74a to 74f, as shown in FIG. 24, the program 74a function as a various-data transmitting/receiving process 75a, the program 74b as a customer-knowledge-level-value calculating process 75b, the program 74c as an outbound-material extracting process 75c, the program 74d as a various-data extracting process 75d, the program 74e as a various-data output process 75e, and the program 74f as an outbound-effect calculating process 75f. The process 75a corresponds to the various-data transmitting/receiving unit 43a shown in FIG. 20, the process 75b to the customer-knowledge-level-value calculating unit 43b, the process 75c to the outbound-material extracting unit 43c, the process 75d to the various-data extracting unit 43d, the process 75e to the various-data output unit 43e, and the process 75f to the outbound-effect calculating unit 43f.

The HDD 72 stores therein, as shown in FIG. 24, an inbound-log data table 72a, a theme-linked-by-knowledge data table 72b, a material-linked-by-operation-contents data table 72c, a theme/CKLV-linked-by-material data table 72d, a CKLV-linked-by-customer/theme data table 72e, a customer-information data table 72f, and an outbound-log data table 72g. The inbound-log data table 72a corresponds to the inbound-log DB 42a shown in FIG. 20, the theme-linked-by-knowledge data table 72b to the theme-linked-by-knowledge DB 42b, the material-linked-by-operation-contents data table 72c to the material-linked-by-operation-contents DB 42c, the theme/CKLV-linked-by-material data table 72d to the theme/CKLV-linked-by-material DB 42d, the CKLV-linked-by-customer/theme data table 72e to the CKLV-linked-by-customer/theme DB 42e, the customer-information data table 72f to the customer-information DB 42f, and the outbound-log data table 72g to the outbound-log DB 42g. The CPU 75 reads out inbound-log data 73a from the inbound-log data table 72a, theme-linked-by-knowledge data 73b from the theme-linked-by-knowledge data table 72b, material-linked-by-operation-contents data 73c from the material-linked-by-operation-contents data table 72c, theme/CKLV-linked-by-material data 73d from the theme/CKLV-linked-by-material data table 72d, customer/theme-correspondence-knowledge-level value data 73e from the CKLV-linked-by-customer/theme data table 72e, customer information data 73f from the customer-information data table 72f, and outbound-log data 73g from the outbound-log data table 72g, and stores them in the RAM 73. Thereafter, the CPU 75 uses the inbound-log data 73a, the theme-linked-by-knowledge data 73b, the material-linked-by-operation-contents data 73c, the theme/CKLV-linked-by-material data 73d, the customer/theme-correspondence-knowledge-level value data 73e, the customer information data 73f, and the outbound-log data 73g stored in the RAM 73 and executes the outbound-operation support process.

Each of the programs 74a to 74f is not necessarily stored in advance in the ROM 74. For example, each of the programs 74a to 74f can be stored in a physical removable medium such as a flexible disk, a CD-ROM, a DVD, a magneto optical disk, or an IC card. Further, each of the programs 74a to 74f can be stored in a built-in physical medium including an HDD installed inside or outside the computer 70. Moreover, it is acceptable to store each of the programs in the other computer or a server that is connected to the computer 70 via a communication line, the Internet, a LAN, or a WAN so that the computer 70 reads out each of the programs to execute.

According to an aspect of the present invention, an outbound operation is supported based on information collected the inbound operations thereby increasing the likelihood of success in the outbound operations.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An outbound-operation support apparatus that supports an outbound operation with respect to customers by using information obtained through an inbound operation with respect to the customers, the outbound-operation support apparatus comprising:

a first storing unit that stores therein an outbound material used for the outbound operation by associating the outbound material with contents of the outbound operation;

a second storing unit that stores therein a related theme related to the outbound material, a customer knowledge level determined in advance with respect to each customer, and a success rate obtained when the outbound operation is performed by using the outbound material, by associating each of the related theme, the customer knowledge level, and the success rate with the outbound material;

a third storing unit that stores therein a theme and the customer knowledge level that have been used for performing the inbound operation, by associating each of the theme and the customer knowledge level with a customer identifier unique to each of the customers;

a fourth storing unit that stores therein customer information related to each of the customers, by associating the customer information with the customer identifier;

a first extracting unit that extracts the outbound material stored in the first storing unit based on the contents of the outbound operation upon receiving input of the contents of the outbound operation;

a second extracting unit that extracts the related theme and the customer knowledge level that correspond to the outbound material extracted by the first extracting unit and for which the success rate corresponding to the outbound material extracted by the first extracting unit is larger than a predetermined threshold value from among the related theme and the customer knowledge level stored in the second storing unit;

a third extracting unit that extracts the customer identifier stored in the third storing unit, in relation to the related theme and the customer knowledge level extracted by the second extracting unit;

a fourth extracting unit that extracts the customer information stored in the fourth storing unit, in relation to the customer identifier extracted by the third extracting unit;

a fifth storing unit that stores therein an outbound log including the contents of the outbound operation, the outbound material used for the outbound operation, date and time when the outbound operation has been performed, and a result of the outbound operation, by associating each of the outbound log, the outbound material, the date and time when the outbound operation has been performed, and the result of the outbound operation with the customer identifier to the customer with which the outbound operation has been performed, when the outbound operation is performed; and an output unit that outputs the outbound material extracted by the first extracting unit and the customer information extracted by the fourth extracting unit.

2. The outbound-operation support apparatus according to claim 1, further comprising a first calculating unit that calculates the customer knowledge level based on the information obtained through the inbound operation, wherein the second storing unit stores therein the customer knowledge level calculated by the first calculating unit, and the third storing unit stores therein the customer knowledge level calculated by the first calculating unit.

3. The outbound-operation support apparatus according to claim 2, further comprising:

a second calculating unit that calculates a word level of a customer based on a usage rate of a technical word included in a conversation made by the customer when asking a question in the inbound operation; and a third calculating unit that calculates a time level of the customer based on time taken by the customer when asking a question in the inbound operation, wherein the first calculating unit calculates the customer knowledge level based on the word level and the time level.

4. The outbound-operation support apparatus according to claim 3, further comprising a fourth calculating unit that calculates an understanding level of the customer based on a response made by the customer in the inbound operation and attribute information of an agent, wherein the first calculating unit calculates the customer knowledge level based on the word level, the time level, and the understanding level.

5. The outbound-operation support apparatus according to claim 1, further comprising:

a fifth calculating unit that calculates the success rate of the outbound operation with respect to each related theme and each customer knowledge level associated with the outbound material, based on the outbound log stored in the fifth storing unit, wherein the second storing unit stores therein the success rate calculated by the first calculating unit.

6. A method of supporting an outbound operation with respect to customers by using information obtained through an inbound operation with respect to the customers, the method comprising:

first storing including storing an outbound material used for the outbound operation by associating the outbound material with contents of the outbound operation;

second storing including storing a related theme related to the outbound material, a customer knowledge level determined in advance with respect to each customer, and a success rate obtained when the outbound operation is performed by using the outbound material, by associating each of the related theme, the customer knowledge level, and the success rate with the outbound material;

third storing including storing a theme and the customer knowledge level that have been used for performing the inbound operation, by associating each of the theme and the customer knowledge level with a customer identifier unique to each of the customer;

fourth storing including storing customer information related to each of the customers, by associating the customer information with the customer identifier;

first extracting including extracting the outbound material stored at the first storing based on the contents of the outbound operation upon receiving input of the contents of the outbound operation;

second extracting including extracting the related theme and the customer knowledge level that correspond to the outbound material extracted at the first extracting and for which the success rate corresponding to the outbound material extracted at the first extracting is larger than a predetermined threshold value from among the related theme and the customer knowledge level stored at the second storing;

third extracting including extracting the customer identifier stored at the third storing, in relation to the related theme and the customer knowledge level extracted at the second extracting;

fourth extracting including extracting the customer information stored at the fourth storing, in relation to the customer identifier extracted at the third extracting;

fifth storing including storing an outbound log including the contents of the outbound operation, the outbound material used for the outbound operation, date and time when the outbound operation has been performed, and a result of the outbound operation, by associating each of the outbound log, the outbound material, the date and time when the outbound operation has been performed, and the result of the outbound operation with the customer identifier to the customer with which the outbound operation has been performed, when the outbound operation is performed; and outputting the outbound material extracted at the first extracting and the customer information extracted at the fourth extracting.

7. The method according to claim 6, further comprising first calculating including calculating the customer knowledge level based on the information obtained through the inbound operation, wherein the second storing includes storing the customer knowledge level calculated at the first calculating, and the third storing includes storing the customer knowledge level calculated at the first calculating.

8. The method according to claim 7, further comprising:

second calculating including calculating a word level of a customer based on a usage rate of a technical word included in a conversation made by the customer when asking a question in the inbound operation; and third calculating including calculating a time level of the customer based on time of the customer when asking a question in the inbound operation, wherein the first calculating includes calculating the customer knowledge level based on the word level and the time level.

9. The method according to claim 8, further comprising fourth calculating including calculating an understanding level of the customer based on a response made by the customer in the inbound operation and attribute information of an agent, wherein the first calculating includes calculating the customer knowledge level based on the word level, the time level, and the understanding level.

10. The method according to claim 6, further comprising:

fifth calculating including calculating the success rate of the outbound operation with respect to each related theme and each customer knowledge level associated with the outbound material, based on the outbound log stored at the fifth storing, wherein the second storing includes storing the success rate calculated at the first calculating.

11. A no-transitory computer-readable recording medium that stores therein a computer program that causes a computer to support an outbound operation with respect to customers by using information obtained through an inbound operation with respect to the customers, the computer program causing the computer to execute:

first storing including storing an outbound material used for the outbound operation by associating the outbound material with contents of the outbound operation;

second storing including storing a related theme related to the outbound material, a customer knowledge level determined in advance with respect to each customer, and a success rate obtained when the outbound operation is performed by using the outbound material, by associating each of the related theme, the customer knowledge level, and the success rate with the outbound material;

third storing including storing a theme and the customer knowledge level that have been used for performing the inbound operation, by associating each of the theme and the customer knowledge level with a customer identifier unique to each of the customer;

fourth storing including storing customer information related to each of the customers, by associating the customer information with the customer identifier;

first extracting including extracting the outbound material stored at the first storing based on the contents of the outbound operation upon receiving input of the contents of the outbound operation;

second extracting including extracting the related theme and the customer knowledge level that correspond to the outbound material extracted at the first extracting and for which the success rate corresponding to the outbound material extracted at the first extracting is larger than a predetermined threshold value from among the related theme and the customer knowledge level stored at the second storing;

third extracting including extracting the customer identifier stored at the third storing, in relation to the related theme and the customer knowledge level extracted at the second extracting;

fourth extracting including extracting the customer information stored at the fourth storing, in relation to the customer identifier extracted at the third extracting;

fifth storing including storing an outbound log including the contents of the outbound operation, the outbound material used for the outbound operation, date and time when the outbound operation has been performed, and a result of the outbound operation, by associating each of the outbound log, the outbound material, the date and time when the outbound operation has been performed, and the result of the outbound operation with the customer identifier to the customer with which the outbound operation has been performed, when the outbound operation is performed; and outputting the outbound material extracted at the first extracting and the customer information extracted at the fourth extracting.

12. The non-transitory computer-readable recording medium according to claim 11, the computer program further causes the computer to execute first calculating including calculating the customer knowledge level based on the information obtained through the inbound operation, wherein the second storing includes storing the customer knowledge level calculated at the first calculating, and the third storing includes storing the customer knowledge level calculated at the first calculating.

13. The non-transitory computer-readable recording medium according to claim 12, the computer program further causes the computer to execute:

second calculating including calculating a word level of a customer based on a usage rate of a technical word included in a conversation made by the customer when asking a question in the inbound operation; and third calculating including calculating a time level of the customer based on time of the customer when asking a question in the inbound operation, wherein the first calculating includes calculating the customer knowledge level based on the word level and the time level.

14. The non-transitory computer-readable recording medium according to claim 13, the computer program further causes the computer to execute fourth calculating including calculating an understanding level of the customer based on a response made by the customer in the inbound operation and attribute information of an agent, wherein the first calculating includes calculating the customer knowledge level based on the word level, the time level, and the understanding level.

15. The non-transitory computer-readable recording medium according to claim 11, the computer program further causes the computer to execute:

fifth calculating including calculating the success rate of the outbound operation with respect to each related theme and each customer knowledge level associated with the outbound material, based on the outbound log stored at the fifth storing, wherein the second storing includes storing the success rate calculated at the first calculating.

* * * * *

UNITED STATES PATENT AND TRADEMARK OFFICE
CERTIFICATE OF CORRECTION

| | | |
|---|---|---|
| PATENT NO. | : 7,839,991 B2 | |
| APPLICATION NO. | : 11/881537 | |
| DATED | : November 23, 2010 | |
| INVENTOR(S) | : Shinpuku et al. | |

It is certified that error appears in the above-identified patent and that said Letters Patent is hereby corrected as shown below:

Claim 11
Col. 23, Line 1   Delete "no-transitory" and insert --non-transitory-- in its place.

Signed and Sealed this
First Day of March, 2011

David J. Kappos
*Director of the United States Patent and Trademark Office*